United States Patent
Aoki et al.

(10) Patent No.: US 8,886,376 B2
(45) Date of Patent: Nov. 11, 2014

(54) CONTROL APPARATUS FOR MOTOR-ASSISTED BICYCLE

(75) Inventors: Koji Aoki, Saitama (JP); Hisashi Murakami, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 333 days.

(21) Appl. No.: 13/243,276

(22) Filed: Sep. 23, 2011

(65) Prior Publication Data

US 2012/0083956 A1  Apr. 5, 2012

(30) Foreign Application Priority Data

Sep. 30, 2010  (JP) ................. 2010-223013

(51) Int. Cl.
*B62M 6/45* (2010.01)

(52) U.S. Cl.
CPC ...................................... *B62M 6/45* (2013.01)
USPC .......................................................... 701/22

(58) Field of Classification Search
CPC ......... B60L 1/00; B60L 1/20; B60L 2200/12; B60L 2240/54; B60W 20/00; B60W 10/24; B60W 10/26; B60W 20/106; B60W 20/50; B60W 30/1886; B60W 50/082; B60W 2300/36; B60W 10/08; B62M 6/00; B62M 6/40; B62M 6/45; B62M 6/10
USPC ....................... 701/22, 48, 1; 180/65.1, 65.26
See application file for complete search history.

(56) References Cited

U.S. PATENT DOCUMENTS

| | | | | |
|---|---|---|---|---|
| 5,806,621 | A * | 9/1998 | Soda et al. | 180/206.4 |
| 5,878,831 | A * | 3/1999 | Saito et al. | 180/206.2 |
| 5,937,962 | A * | 8/1999 | Yokoyama | 180/205.4 |
| 7,706,935 | B2 * | 4/2010 | Dube et al. | 701/22 |

FOREIGN PATENT DOCUMENTS

| | | |
|---|---|---|
| EP | 0 798 204 A1 | 10/1997 |
| JP | 3642364 B2 | 4/2005 |

* cited by examiner

*Primary Examiner* — Helal A Algahaim
*Assistant Examiner* — Genna Mott
(74) *Attorney, Agent, or Firm* — Birch, Stewart, Kolasch & Birch, LLP

(57) ABSTRACT

A control apparatus for a motor-assisted bicycle detects a pedaling torque applied to a crankshaft with a pedaling force sensor, controls a motor unit of the motor-assisted bicycle in a regenerative control process to charge a battery, if the torque value of the detected pedaling torque is equal to or smaller than a predetermined level, and controls the motor unit in an assistive control process, if the torque value is greater than the predetermined level. The control apparatus performs an assistive transient control process with an assistive ratio lower than in the assistive control process while the crankshaft makes a predetermined number of revolutions and thereafter performs the regenerative control process, if the torque value detected by the pedaling force sensor has a peak equal to or smaller than the predetermined level.

18 Claims, 16 Drawing Sheets

CONTROL APPARATUS FOR MOTOR-ASSISTED BICYCLE

CROSS-REFERENCE TO RELATED APPLICATIONS

This application claims priority under 35 U.S.C. §119(a) to Application No. 2010-223013, filed in Japan on Sep. 30, 2010. The entirety of the above-identified application is expressly incorporated herein by reference.

BACKGROUND OF THE INVENTION

1. Field of the Invention

The present invention relates to a control apparatus for a motor-assisted bicycle, which increases the drivability of the motor-assisted bicycle when the motor-assisted bicycle switches from an assistive control process to a regenerative control process.

2. Description of Background Art Japanese Patent No. 3642364 referred to below discloses that a bicycle with assistive power is assisted by energizing a motor to generate an assistive force depending on a pedaling torque applied to a crankshaft. The motor is controlled to switch to a regenerated state if a detected peak of the pedaling torque is smaller than a pedaling torque determined depending on the vehicle speed of the bicycle.

According to the technology disclosed in Japanese Patent No. 3642364, if the peak of the pedaling torque applied to the crankshaft is smaller than a pedaling torque determined depending on the vehicle speed of the motor-assisted bicycle (predetermined pedaling torque), then the motor immediately regenerates electric power and charges a battery with the regenerated electric power. Therefore, when the predetermined pedaling torque is reached, the crankshaft abruptly undergoes a regenerative friction, posing a large load on the rider of the motor-assisted bicycle and making the rider experience a strange feeling.

SUMMARY OF THE INVENTION

The present invention has been made in view of the problems of the background art. It is an object of the present invention to provide a control apparatus for a motor-assisted bicycle which increases the drivability of the motor-assisted bicycle when the motor-assisted bicycle switches from an assistive control process to a regenerative control process.

To achieve the above objects, according to a first aspect of the present invention, there is provided a control apparatus (250) for a motor-assisted bicycle (10) for detecting a pedaling torque applied to a crankshaft (48) with a pedaling force sensor (110), controlling a motor unit (28) of the motor-assisted bicycle (10) in a regenerative control process to charge a battery (44), if the torque value of the detected pedaling torque is equal to or smaller than a predetermined level, and controlling the motor unit (28) in an assistive control process, if the torque value is greater than the predetermined level, wherein the control apparatus (250) performs an assistive transient control process with an assistive ratio lower than in the assistive control process while the crankshaft (48) makes a predetermined number of revolutions and thereafter performs the regenerative control process, if the torque value detected by the pedaling force sensor (110) has a peak equal to or smaller than the predetermined level.

According to a second aspect of the present invention, the control apparatus (250) operates in an assistive mode for performing the assistive control process and a regenerative mode for performing the regenerative control process; the control apparatus(250) includes a mode determiner (264) for determining which one of the assistive mode and the regenerative mode is to be performed; and the mode determiner (264) determines that an assistive transient mode for performing the assistive transient control process is to be performed, if the mode determiner (264) detects that the torque value detected by the pedaling force sensor (110) has a peak equal to or smaller than the predetermined level after the mode to be performed has switched from the assistive mode to the regenerative mode.

According to a third aspect of the present invention, the control apparatus further includes: a crankshaft rotational speed detector (282) for detecting a rotational speed of the crankshaft (48) with a counter for measuring a time during which the assistive transient mode continues while the assistive transient mode is performed; and a transient coefficient setting section (280) for setting a transient coefficient to reduce the assistive ratio each time the crankshaft (48) makes one-half of a revolution, wherein the control apparatus (250) performs the assistive transient control process with an assistive ratio that is reduced based on the transient coefficient set by the transient coefficient setting section (280).

According to a fourth aspect of the present invention, the control apparatus further includes: a vehicle speed information detector (66) for detecting a vehicle speed information value representing a vehicle speed of the motor-assisted bicycle (10); and decision means for determining which one of the assistive mode and the regenerative mode is to be performed, depending on the pedaling torque and the vehicle speed of the motor-assisted bicycle (10), wherein the mode determiner (264) determines the mode to be performed from the decision means, using the torque value detected by the pedaling force sensor (110) and the vehicle speed information value detected by the vehicle speed information detector (66).

According to a fifth aspect of the present invention, the control apparatus further includes: a state-of-charge detector (260) for detecting the state of charge of the battery (44), wherein the decision means includes a plurality of decision means provided depending on the state of charge of the battery (44), and the mode determiner (264) determines the mode to be performed from the decision means, which corresponds to the state of charge of the battery (44) that is detected by the state-of-charge detector (260).

According to a sixth aspect of the present invention, the plurality of decision means provided depending on the state of charge of the battery (44) are determined such that the predetermined level is higher as the state of charge of the battery (44) is lower.

According a seventh aspect of the present invention, the decision means includes a preset decision map.

According to an eighth aspect of the present invention, the control apparatus (250) varies the predetermined level depending on the state of charge of the battery (44).

According to the first aspect of the present invention, if the torque value detected by the pedaling force sensor has a peak equal to or smaller than the predetermined level, then the assistive transient control process is performed and thereafter it changes to the regenerative control process. Consequently, the crankshaft is prevented from becoming abruptly sluggish and the load on the rider of the motor-assisted bicycle is prevented from abruptly increasing. The regenerative control process thus smoothly starts to be performed without making the rider experience a strange feeling.

According to the second aspect of the present invention, the mode determiner determines that an assistive transient mode for performing the assistive transient control process is to be performed, if the torque value detected by the pedaling force sensor has a peak equal to or smaller than the predetermined level after the mode to be performed has switched from the assistive mode to the regenerative mode. Therefore, even if the regenerative mode is determined as the mode to be performed, the motor-assisted bicycle is continuously assisted as long as the assistive transient mode is determined.

According to the third aspect of the present invention, as a pedaling force is generated per one-half of a revolution of the crankshaft, a transient coefficient for reducing an assistive ratio may be set each time the crankshaft makes one-half of a revolution for thereby reducing the control quantity of the assistive transient control process each time the crankshaft makes one-half of a revolution. Consequently, the assistive control process can switch to the regenerative control process without making the rider of the motor-assisted bicycle experience a strange feeling.

According to the fourth aspect of the present invention, a mode to be performed is determined using the decision means for determining which one of the assistive mode and the regenerative mode is to be performed, depending on the pedaling torque and the vehicle speed of the motor-assisted bicycle. Therefore, it is easy to realize the assistive control process and the regenerative control process as desired.

According to the fifth aspect of the present invention, inasmuch as there is a plurality of decision means depending on the state of charge of the battery, a mode to be performed can appropriately be determined depending on the state of charge of the battery.

According to the sixth and seventh aspects of the present invention, the plurality of decision means provided depending on the state of charge of the battery is determined such that the predetermined level is higher as the state of charge of the battery is lower. Therefore, the regenerative mode is more likely to be determined as a mode to be performed as the state of charge of the battery is lower, making the battery more likely to be charged.

According to the eighth aspect of the present invention, the predetermined level is varied depending on the state of charge of the battery. Consequently, in order to keep the battery efficiently usable for a longer period of time, when the state of charge of the battery is lower, the battery is more frequently charged with regenerated electric power to prevent itself from being overcharged. When the state of charge of the battery is higher, the motor-assisted bicycle is more frequently assisted to prevent the battery from being overcharged.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
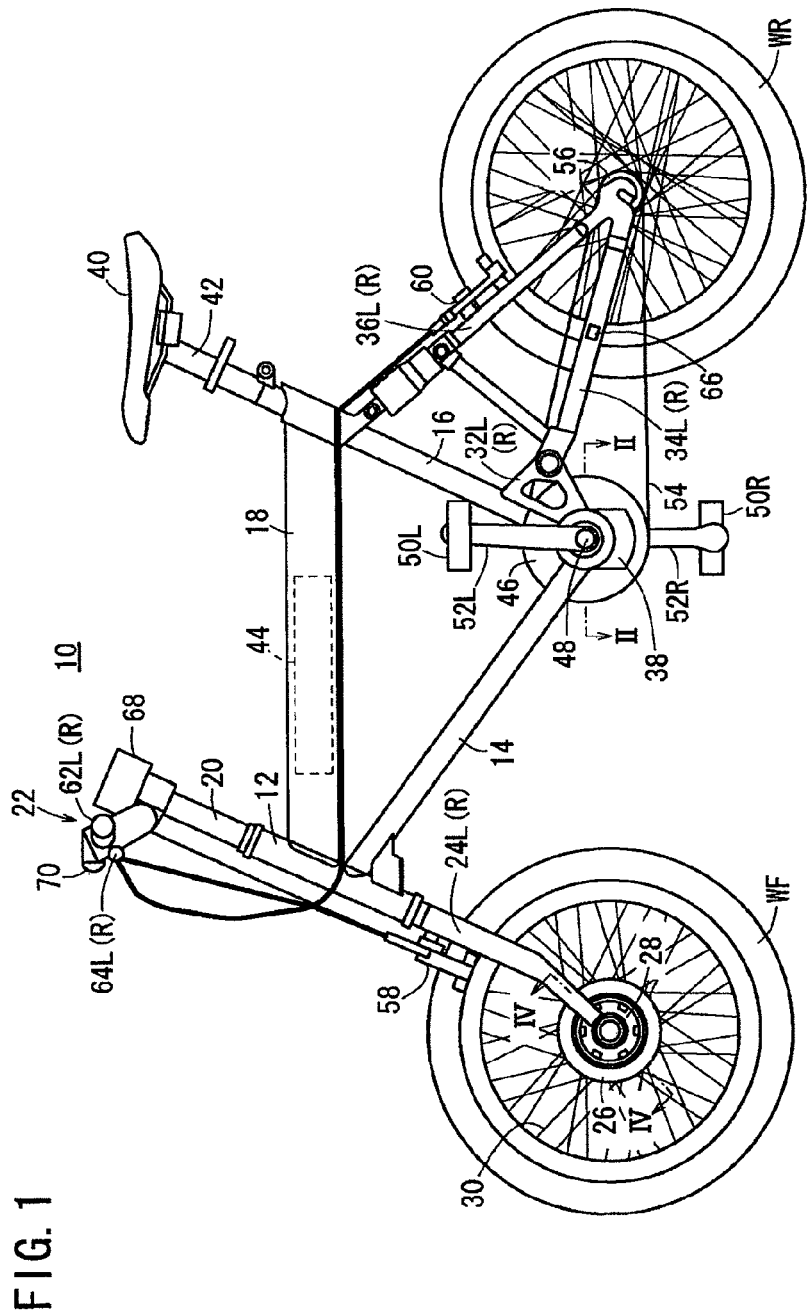
FIG. 1 is a left side elevational view of a motor-assisted bicycle (assisted bicycle)

The present invention will now be described with reference to the accompanying drawings, wherein the same reference numerals have been used to identify the same or similar elements throughout the several views.

A pedaling force detecting device and a control apparatus for a motor-assisted bicycle according to a preferred embodiment of the present invention will be described in detail below with reference to the accompanying drawings.

FIG. 1 is a left side elevational view of a motor-assisted bicycle (assisted bicycle) 10. The assisted bicycle 10 includes mechanisms or components that are provided symmetrically as pairs on left and right sides of the bicycle body. Those on the left side are indicated by reference numerals with a suffix "L," and those on the right side by reference numerals with a suffix "R." The assisted bicycle 10 includes a head pipe 12 positioned in a front portion of the bicycle body, a down frame 14 extending rearwardly and downwardly from the head pipe 12, a seat pipe 16 extending upwardly from the rear end of the down frame 14, and a top frame 18 extending rearwardly from the head pipe 12 above the down frame 14 and connected to the seat pipe 16.

A handlebar 22 is connected to the upper end of a steering shaft 20 and has a substantially intermediate portion rotatably held by the head pipe 12. A front wheel WF is rotatably supported by a pair of front fork members 24L, 24R disposed in the front portion of the bicycle body and extending from the front end of the steering shaft 20. The front wheel WF has a hub 26 incorporating a motor unit 28 therein and a plurality of spokes 30 joined to the outer circumferential surface of the hub 26.

A pair of plates 32L, 32R is disposed behind the seat pipe 16. A rear wheel WR is rotatably supported by the rear ends of a pair of rear fork members 34L, 34R, which extend rearwardly from the plates 32L, 32R. A pair of stays 36L, 36R is disposed below the top frame 18 and extends rearwardly and downwardly from the seat pipe 16. The stays 36L, 36R are connected to the respective rear fork members 34L, 34R.

The down frame 14 and the seat pipe 16 support a pedaling force detecting device 38. A seat 40 is mounted on the upper end of a seat post 42, which is mounted on the seat pipe 16, for adjusting the vertical position of the seat 40. The top frame 18 houses therein a battery 44 for energizing the motor unit 28. The battery 44 is accommodated in the top frame 18 against removal from the assisted bicycle 10. Therefore, the battery 44 can be charged only by regenerative electric power, which is generated by the motor unit 28. However, the battery 44 may be made removable so that it can be charged by a charger.

A crankshaft 48 extends transversely across the bicycle body through the pedaling force detecting device 38 and a sprocket (rear wheel drive member) 46. A crank 52L with a pedal 50L and a crank 52R with a pedal 50R are coupled to the respective opposite ends of the crankshaft 48. When the rider steps on the pedals 50L, 50R, a pedaling torque (power) is applied to the crankshaft 48. The pedaling torque applied to the crankshaft 48 rotates the sprocket 46. The rotation of the sprocket 46 is transmitted through a chain 54 to a rear wheel sprocket 56 on the rear wheel WR, rotating the rear wheel WR. The sprocket 46, the chain 54, and the rear wheel sprocket 56 function as a drive mechanism.

The front fork members 24L, 24R support thereon a front wheel cantilever brake 58 for stopping rotation of the front wheel WF. The stays 36L, 36R support thereon a rear wheel cantilever brake 60 for stopping rotation of the rear wheel WR. The handlebar 22 has grips 62L, 62R and brake levers 64L, 64R. When the brake lever 64R is operated, the front wheel cantilever brake 58 is actuated. When the brake lever 64L is operated, the rear wheel cantilever brake 60 is actuated.

A vehicle speed sensor (vehicle speed information detector) 66 serves to detect a vehicle speed from the rotational speed of the rear wheel WR (vehicle wheel). A speedometer, not shown, for displaying the vehicle speed of the assisted bicycle 10 as detected by the vehicle speed sensor 66 and a display unit 68 are mounted on an upper portion of the handlebar 22. A headlight 70 is mounted on a front portion of the handlebar 22. The vehicle speed sensor 66 may detect a vehicle speed from the rotational speed of the front wheel WF (vehicle wheel). In such a case, the vehicle speed sensor 66 is disposed in a position where it can detect the rotational speed of the front wheel WF.

Figure 2:
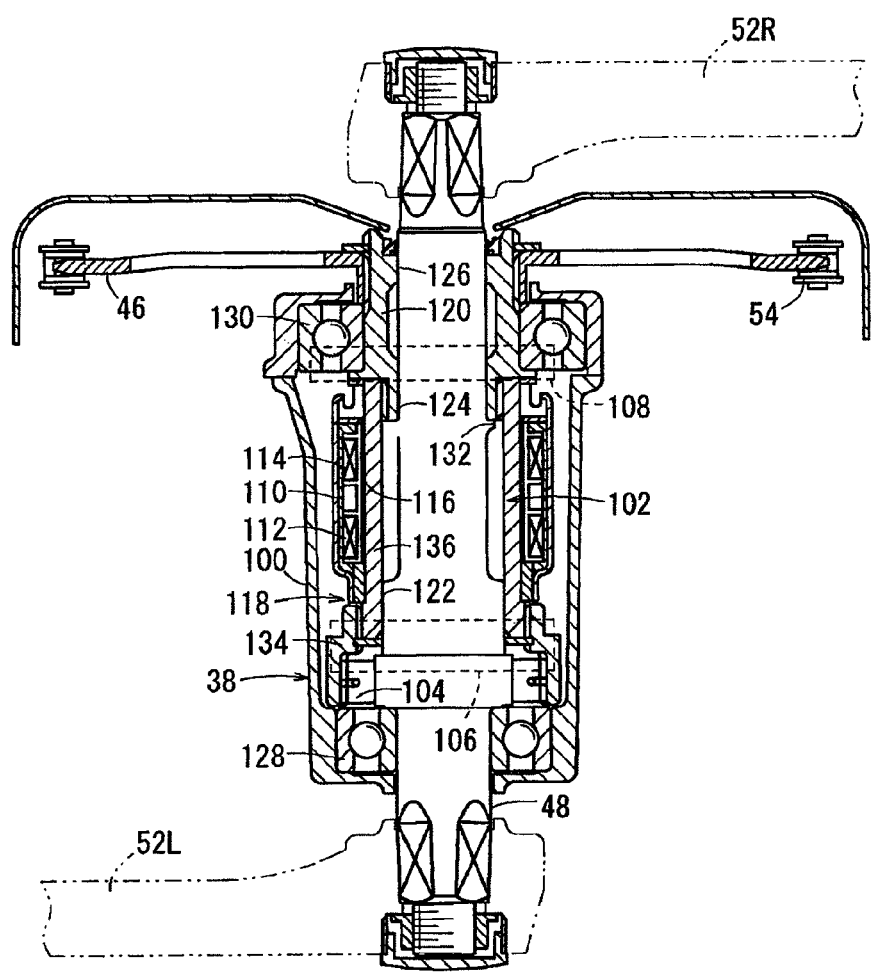
FIG. 2 is a cross-sectional view taken along line II-II across a pedaling force detecting device shown in FIG. 1.

FIG. 2 is a cross-sectional view taken along line II-II across the pedaling force detecting device 38 shown in FIG. 1. The pedaling force detecting device 38 includes a mechanism for rotating the sprocket 46 when the rider steps on the pedals 50L, 50R in a direction (normal direction) to move the assisted bicycle 10 forwardly and stopping the sprocket 46 against rotation when the rider steps on the pedals 50L, 50R in a direction opposite to the normal direction. Specifically, the pedaling force detecting device 38 includes a casing 100, a hollow torque transmitting member 102 disposed in the casing 100 and fitted over the outer circumferential surface of the crankshaft 48, one-way clutch mechanism 104 disposed in the casing 100 between the crankshaft 48 and one side (lower side in FIG. 2) of the hollow torque transmitting member 102, a driver 106 for energizing a brushless motor of the motor unit 28, and a controller 108 for performing a PWM control process, etc. on the driver 106.

The one-way clutch mechanism 104 includes a structure for transmitting the pedaling torque of the crankshaft 48 to the hollow torque transmitting member 102, when the pedals 50L, 50R are stepped on in the normal direction, and preventing the pedaling torque of the crankshaft 48 from being transmitted to the hollow torque transmitting member 102, when the pedals 50L, 50R are stepped on in the direction opposite to the normal direction. The sprocket 46 is connected to the other side (upper side in FIG. 2) of the hollow torque transmitting member 102. Specifically, the other side of the hollow torque transmitting member 102 has splines with the sprocket 46 being fitted over the splines.

When the pedals 50L, 50R are stepped on in the normal direction, the crankshaft 48 is rotated, causing the one-way clutch mechanism 104 to rotate the hollow torque transmitting member 102. The sprocket 46 is rotated to propel the assisted bicycle 10 forwardly. When the pedals 50L, 50R are stepped on in the direction opposite to the normal direction, the crankshaft 48 is rotated, but the hollow torque transmitting member 102 is prevented from rotating by the one-way clutch mechanism 104. Therefore, when the pedals 50L, 50R are stepped on in the direction opposite to the normal direction, the sprocket 46 is not rotated and hence the assisted bicycle 10 is not propelled forwardly.

The pedaling torque applied to the crankshaft 48 is detected by a pedaling force sensor (magnetostrictive sensor) 110, which is relatively rotatably disposed on the hollow torque transmitting member 102. The pedaling force sensor 110 includes two detecting coils 112, 114 and a magnetic film 116 disposed on an outer circumferential surface of the hollow torque transmitting member 102 in facing relation to the detecting coils 112, 114. The pedaling force sensor 110 converts a change in the inductance of the detecting coils 112, 114, which is caused by a torsion that is generated when the hollow torque transmitting member 102 is rotated, into a voltage, and outputs the voltage to the controller 108.

The hollow torque transmitting member 102 includes a first hollow member 118, which is rotated by the pedaling torque applied from the crankshaft 48 and borne by one side thereof, with the pedaling force sensor 110 being mounted on the outer circumferential surface of the first hollow member 118, and a second hollow member 120 fitted in the other side of the first hollow member 118 and connected to the sprocket 46 remotely from the fitting region. The first hollow member 118 and the second hollow member 120 are held in abutting fitting engagement with each other in the fitting region. Since the hollow torque transmitting member 102 includes the first hollow member 118 and the second hollow member 120, the fitting region where they are held in abutting fitting engagement with each other is capable of reducing the adverse effect of the force of a torsion that is developed by the relationship between the force tending to lower the crankshaft 48 forwardly and downwardly at the time a strong pedaling force is applied and the force applied from the chain 54 to the sprocket 46. Consequently, the adverse effect of the torsion generated in the pedaling force sensor 110 is reduced, thereby increasing the detecting accuracy of the pedaling force sensor 110.

The first hollow member 118 includes a first engaging portion 122 engaging the crankshaft 48 at its side near the one-way clutch mechanism 104. The second hollow member 120 includes a second engaging portion 124 engaging the crankshaft 48 in the fitting region where the first hollow member 118 and the second hollow member 120 are held in abutting fitting engagement with each other, and a third engaging portion 126 engaging the crankshaft 48 in a region where the second hollow member 120 is connected to the sprocket 46. As the crankshaft 48 is supported at three positions, i.e., by the first engaging portion 122, the second engaging portion 124, and the third engaging portion 126, a torsion which is developed in the hollow torque transmitting member 102 by the relationship between the force tending to lower the crankshaft 48 forwardly and downwardly and the force applied from the chain 54 to the sprocket 46 is reduced, thereby increasing the detecting accuracy of the pedaling force sensor 110.

The crankshaft 48 is rotatably supported in the casing 100 by a bearing (first bearing) 128, which is disposed outwardly of the one-way clutch mechanism 104. The hollow torque transmitting member 102 and the crankshaft 48 are rotatably supported in the casing 100 by a bearing (second bearing) 130 which is disposed in a position between the second engaging portion 124 and the third engaging portion 126. Since the bearing 130 is disposed between the second engaging portion 124 and the third engaging portion 126, the force applied to the crankshaft 48 is well borne by the bearing 130 through the second hollow member 120, resulting in an increase in the detecting accuracy of the pedaling force sensor 110.

The crankshaft 48 includes a thrust stop ridge 132 against which the second engaging portion 124 of the second hollow member 120 is held in abutment along a thrust direction of the crankshaft 48. In other words, the second engaging portion 124 and the thrust stop ridge 132 inhibit the hollow torque transmitting member 102 from moving in the thrust direction. Therefore, the hollow torque transmitting member 102 is prevented from being displaced in the thrust direction, resulting in an increase in the detecting accuracy of the pedaling force sensor 110.

The first hollow member 118 further includes a third hollow member 134 supporting on one end thereof an outer member of the one-way clutch mechanism 104 and a fourth hollow member 136 fitting in the third hollow member 134 at its other end. The second hollow member 120 is fitted in the fourth hollow member 136 on the opposite side of the region where the fourth hollow member 136 is fitted in the third hollow member 134. The pedaling force sensor 110 is disposed around the outer circumferential surface of the fourth hollow member 136. Since the first hollow member 118 includes the third hollow member 134 and the fourth hollow member 136, the region where the third hollow member 134 and the fourth hollow member 136 are held in interfitting engagement with each other and the region where the fourth hollow member 136 and the second hollow member 120 are held in interfitting engagement with each other are capable of reducing the adverse effect of the force of the torsion that is developed by the relationship between the force tending to lower the crankshaft 48 forwardly and downwardly at the time a strong pedaling force is applied and the force applied from the chain 54 to the sprocket 46. Consequently, the adverse effect of the torsion generated in the pedaling force sensor 110 is reduced, thereby increasing the detecting accuracy of the pedaling force sensor 110.

Figure 3:
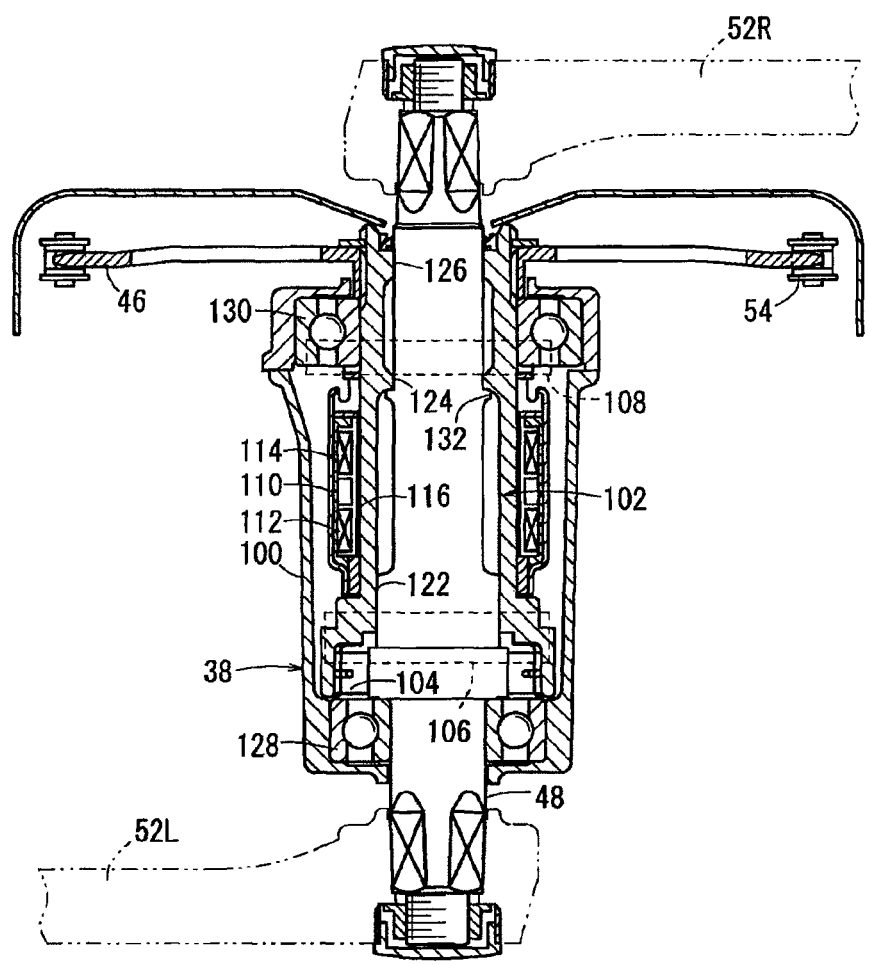
FIG. 3 is a cross-sectional view taken along line II-II across a pedaling force detecting device shown in FIG. 1, where a hollow torque transmitting member is constructed as a single member.

As shown in FIG. 3, the hollow torque transmitting member 102 may be constructed as a single member. FIG. 3 is a cross-sectional view taken along line II-II across the pedaling force detecting device 38 shown in FIG. 1 where the hollow torque transmitting member 102 is constructed as a single member. Those parts shown in FIG. 3 which are identical in structure to those shown in FIG. 2 are denoted by identical reference numerals. In FIG. 3, since the crankshaft 48 is also supported at three positions, i.e., by the first engaging portion 122, the second engaging portion 124, and the third engaging portion 126, a torsion, which is developed in the hollow torque transmitting member 102 by the relationship between the force tending to lower the crankshaft 48 forwardly and downwardly and the force applied from the chain 54 to the sprocket 46, is reduced, thereby increasing the detecting accuracy of the pedaling force sensor 110.

Figure 4:
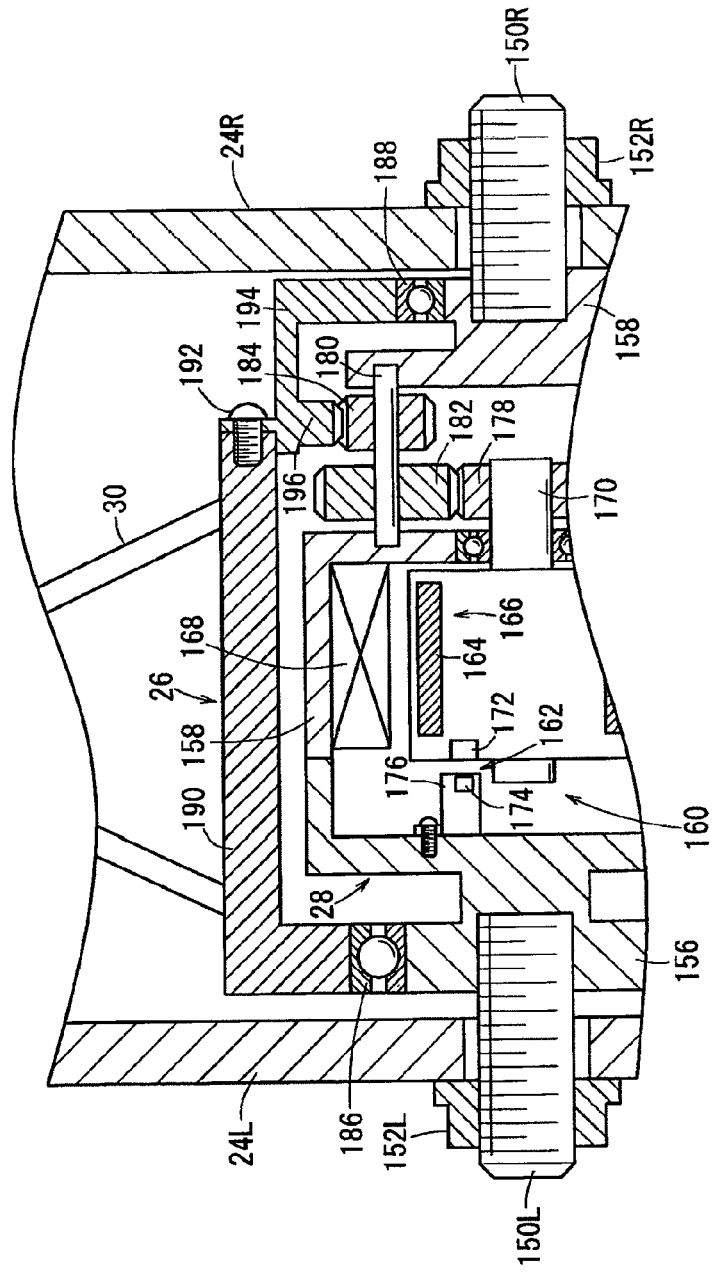
FIG. 4 is a fragmentary cross-sectional view taken along line IV-IV of FIG. 1.

FIG. 4 is a fragmentary cross-sectional view taken along line IV-IV of FIG. 1. The motor unit 28, which is incorporated in the hub 26, is fixed to the left front fork member 24L by an axial screw 150L and a nut 152L and to the right front fork member 24R by an axial screw 150R and a nut 152R. The axial screws 150L, 150R serve as a rotational axle of the front wheel WF. The motor unit 28 includes a brushless motor 160 disposed in a space defined by a left case 156 and a right case 158, and a magnetic pole sensor 162 for detecting an angular displacement of the brushless motor 160. The brushless motor 160 belongs to the background art and will not be described in detail below. The brushless motor 160 includes a rotor 166 having permanent magnets 164 of N and S poles that are disposed alternately circumferentially, and a stator 168 having stator coils in U, V, W phases for generating a revolving magnetic field for rotating the rotor 166. The rotor 166 has a rotational shaft serving as a drive shaft 170 of the motor unit 28. The magnetic pole sensor 162 includes a magnet array 172 rotatable in unison with the rotational shaft of the rotor 166 and a Hall IC 174 for detecting the magnet array 172. The Hall IC 174 is held by a Hall IC housing 176 in facing relation to the magnet array 172. The magnet array 172 includes a plurality of magnets arranged along the circumferential direction of the brushless motor 160, i.e., as many magnets as the number of the permanent magnets 164 of the rotor 166. The magnets of the magnet array 172 include magnets of N pole and magnets of S pole which are arranged alternately. The Hall IC housing 176 is mounted in the left case 156, and the brushless motor 160 is mounted in the right case 158.

The drive shaft 170 of the motor unit 28 is connected to a first drive gear 178, which is held in driving mesh with a first driven gear 182 mounted on a gear shaft 180, which is rotatably supported on the right case 158. Therefore, rotation of the first drive gear 178 is transmitted to the first driven gear 182. The gear shaft 180 also supports thereon a second drive gear 184. When the drive shaft 170 is rotated, the first driven gear 182 is rotated, rotating the gear shaft 180. The rotation of the gear shaft 180 causes the second drive gear 184 to rotate. The hub 26 is rotatably supported on the motor unit 28 by a bearing 186 mounted on the left case 156 and a bearing 188 mounted on the right case 158. The hub 26 can thus rotate about the axial screws 150L, 150R, making the front wheel WF rotatable.

The hub 26 includes a left hub plate 190 and a right hub plate 194 fastened to the left hub plate 190 by screws 192. The bearing 186 is disposed between the left hub plate 190 and the left case 156, and the bearing 188 is disposed between the right hub plate 194 and the right case 158. The right hub plate 194 includes a second driven gear 196 held in mesh with the second drive gear 184. Therefore, drive power from the motor unit 28 is transmitted through the first drive gear 178, the first driven gear 182, the second drive gear 184, and the second driven gear 196 to the hub 26, rotating the hub 26. Consequently, the front wheel WF is rotated by the drive power from the motor unit 28.

The controller 108 performs a PWM control process on the driver 106 to enable the brushless motor 160 to generate an assistive torque, which is determined by an assistance ratio depending on the pedaling torque applied to the crankshaft 48, and the vehicle speed of the assisted bicycle 10. The driver 106 includes a plurality of switching elements in a plurality of phases (U, V, W phases in the present embodiment). The controller 108 selectively turns on and off the switching elements in the U, V, W phases at a predetermined duty ratio to perform the PWM control process on the driver 106. According to the PWM control process, the driver 106 converts a direct current from the battery 44 into three-phase alternating currents, which are supplied to the stator coils in U, V, W phases of the brushless motor 160 to rotate the drive shaft 170.

When the drive shaft 170 of the brushless motor 160 rotates on a sloping road, the stator coils in U, V, W phases generate three-phase alternating currents. The controller 108 performs the PWM control process on the driver 106 to convert the three-phase alternating currents into a direct current. The direct current is supplied to charge the battery 44. In this manner, electric energy is regenerated and supplied to charge the battery 44. The controller 108 includes a clock circuit and also functions as a timer.

Figure 5:
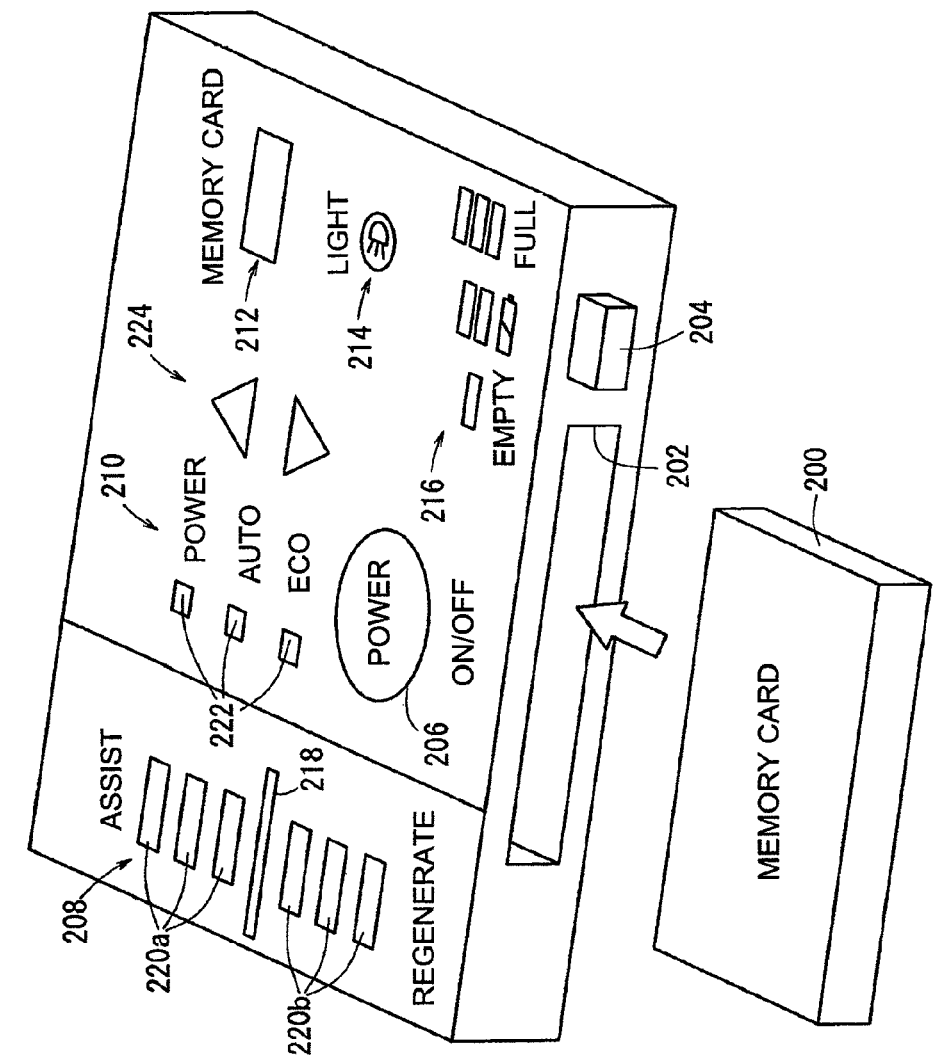
FIG. 5 is a perspective view of a display unit shown in FIG. 1.

FIG. 5 is a perspective view of the display unit 68. The display unit 68 includes a slot (medium mounting unit) 202 for mounting a memory card (medium) 200 therein, an eject button 204 for mechanically ejecting the mounted memory card 200 from the slot 202, and a power switch 206. The display unit 68 also includes an assistance/regeneration display area 208 for displaying whether the assisted bicycle 10 is presently assisted or regenerating electric power to charge the battery 44, a mode display area 210 for displaying a present mode, a memory display area 212 for displaying whether the memory card 200 is mounted or not, a headlight display area 214 for displaying whether the headlight 70 of the assisted bicycle 10 is energized or not, and a battery level display area 216 for displaying the present stored energy level of the battery 44.

The power switch 206 serves to turn on the power supply of the assistive bicycle 10. The display unit 68 includes a light-emitting element, not shown, for illuminating the power switch 206 when the power switch 206 is turned on.

The assistance/regeneration display area 208 serves to display whether the assisted bicycle 10 is presently assisted or regenerating electric power to charge the battery 44, and also to indicate the degree to which the assistive bicycle 10 is assisted and the battery 44 is charged with regenerated electric energy. Specifically, the assistance/regeneration display area 208 includes a plurality of light-emitting areas 220 (220a, 220b) arranged in a vertical array. The upper half light-emitting areas 220a (three light-emitting areas) above a central line 218 are areas for indicating that the assisted bicycle 10 is presently assisted, and the lower half light-emitting areas 220b (three light-emitting areas) below the central line 218 are areas for indicating that the assisted bicycle 10 is presently regenerating electric power to charge the battery 44. The upper half light-emitting areas 220a are selectively lighted depending on the degree to which the assistive bicycle 10 is assisted, and the lower half light-emitting areas 220b are selectively lighted depending on the degree to which the battery 44 is charged with regenerated electric energy.

For example, the three upper half light-emitting areas 220a display the degree to which the assistive bicycle 10 is assisted in three levels. If the degree to which the assistive bicycle 10 is assisted (the amount of electric energy discharged from the battery 44) is in level 1 (lowest), the light-emitting area 220a which is closest to the central line 218 is lighted. If the degree to which the assistive bicycle 10 is assisted is in level 3 (highest), then all the light-emitting areas 220a are lighted. The three lower half light-emitting areas 220b display the degree to which the battery 44 is charged with regenerated electric energy in three levels. If the degree to which the battery 44 is charged with regenerated electric energy (the amount of electric energy supplied to charge the battery 44) is in level 1 (lowest), then the light-emitting area 220b which is closest to the central line 218 is lighted. If the degree to which the battery 44 is charged with regenerated electric energy is in level 3 (highest), then all the light-emitting areas 220b are lighted. The degree to which the assistive bicycle 10 is assisted is higher in proportion to the control quantity of an assistive control process to be performed on the assisted bicycle 10, and the degree to which the battery 44 is charged with regenerated electric energy is higher in proportion to the control quantity of a regenerative control process to be performed on the assisted bicycle 10.

The mode display area 210 serves to display a presently set mode. Specifically, the mode display area 210 includes three modes "POWER," "AUTO," "ECO" which are indicated in the mode display area 210, and light-emitting areas 222 on the left side of the indicated modes, each for displaying a presently set mode. For example, if the light-emitting area 222 on the left side of the indicated mode "POWER" is lighted, then it shows that the presently set mode is the "POWER" mode. If the light-emitting area 222 on the left side of the indicated mode "ECO" is lighted, then it shows that the presently set mode is the "ECO" mode. The mode display area 210 also includes a mode changer switch 224 for changing modes to be set. The rider of the assisted bicycle 10 can change modes to be set by operating the mode changer switch 224. The "POWER" mode is a mode for increasing assistive power. The "ECO" mode is a mode for increasing electric energy to charge the battery 44. The "AUTO" mode is a mode for automatically increasing assistive power or increasing electric energy to charge the battery 44 depending on the running conditions of the assisted bicycle 10.

The memory display area 212 is lighted when the memory card 200 is mounted in the slot 202. The headlight display area 214 is lighted when the headlight 70 is energized. The battery level display area 216 serves to display the present remaining stored energy level of the battery 44. The display areas and the light-emitting areas are lighted when light-emitting elements (e.g., LEDs) or the like combined therewith are energized. The display unit 68 includes those light-emitting elements and a driver (not shown) for energizing the light-emitting elements. The driver is controlled by the controller 108.

Figure 6:
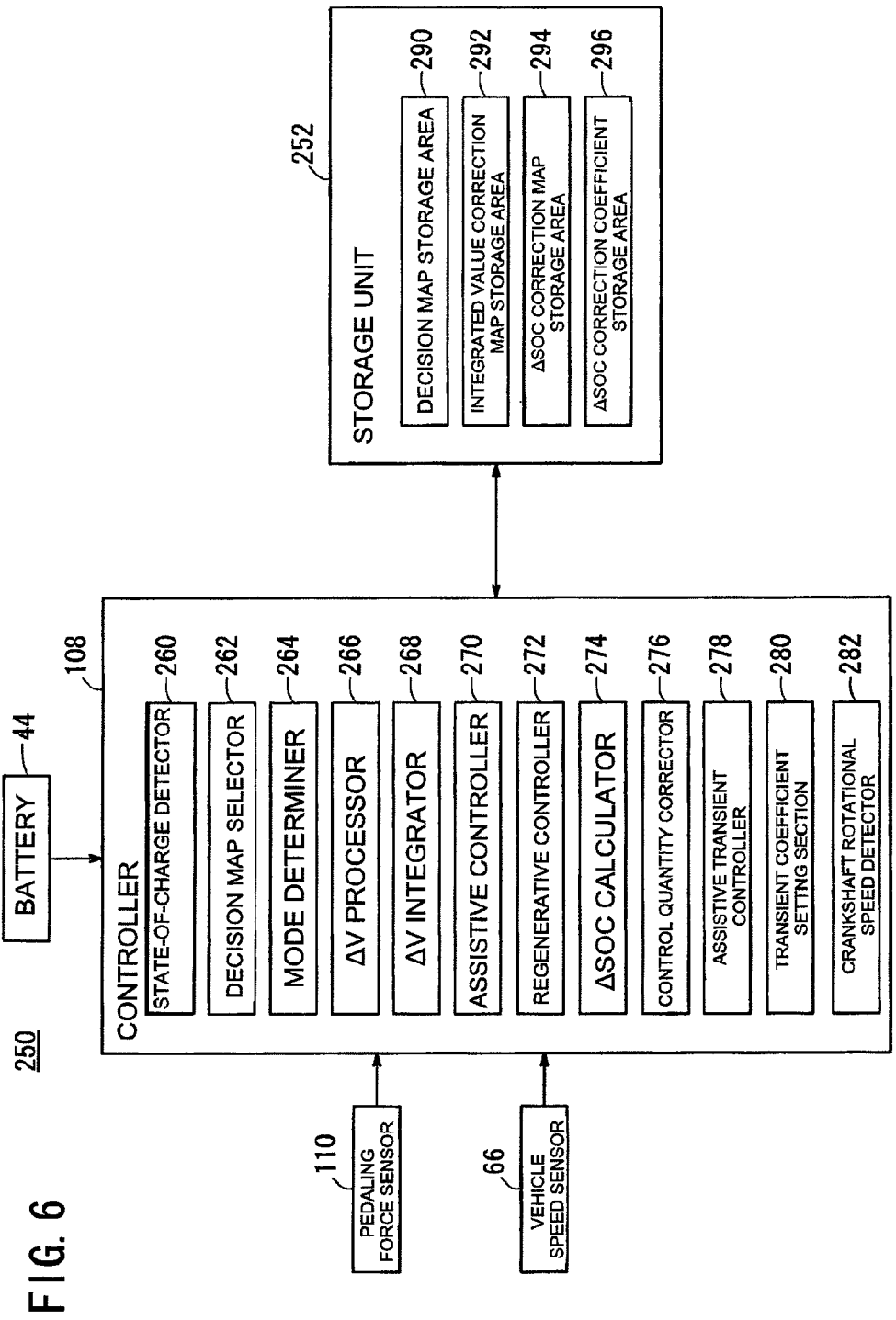
FIG. 6 is a block diagram showing the electric configuration of a control apparatus of the assisted bicycle.

FIG. 6 is a block diagram showing the electric configuration of a control apparatus 250 of the assisted bicycle 10. The control apparatus 250 includes the pedaling force sensor 110, the vehicle speed sensor 66, the controller 108, and a storage unit 252. The controller 108 includes a state-of-charge detector 260, a decision map selector 262, a mode determiner 264, a $\Delta V$ processor 266, a $\Delta V$ integrator 268, an assistive controller 270, a regenerative controller 272, a $\Delta SOC$ calculator 274, a control quantity corrector 276, an assistive transient controller 278, a transient coefficient setting section 280, and a crankshaft rotational speed detector 282. The controller 108 includes a computer (information processor) such as a CPU or the like, which executes given programs to function as the controller 108. The programs may be stored in the storage unit 252 or may be stored in a recording medium, not shown.

The storage unit 252 includes at least a decision map storage area 290 storing a plurality of decision maps (decision means) therein, an integrated value correction map storage area 292 storing ΔV integrated value correction maps therein, a ΔSOC correction map storage area 294 storing ΔSOC correction maps therein, and a ΔSOC correction coefficient storage area 296 storing ΔSOC correction coefficients for the assistive control process and the regenerative control process.

The state-of-charge detector 260 detects the present SOC (State Of Charge) of the battery 44, i.e., the remaining stored energy level of the battery 44. The battery 44 is combined with a voltage sensor and a current sensor, not shown. The state-of-charge detector 260 detects the present SOC of the battery 44 based on a voltage across the battery 44 which is detected by the voltage sensor and a current flowing through the battery 44 which is detected by the current sensor.

The decision map selector 262 selects a decision map to be used from the decision maps stored in the storage unit 252 based on the SOC detected by the state-of-charge detector 260. Each of the decision maps stored in the storage unit 252 determines whether the assistive mode or the regenerative mode is to be carried out based on the torque value T of a pedaling torque and the vehicle speed information value V indicating the vehicle speed of the assisted bicycle 10, and also indicate control quantities of the assistive mode and the regenerative mode. When the control apparatus 250 is in the assistive mode, it performs the assistive control process on the assisted bicycle 10. When the control apparatus 250 is in the regenerative mode, it performs the regenerative control process on the assisted bicycle 10.

Figure 7A:
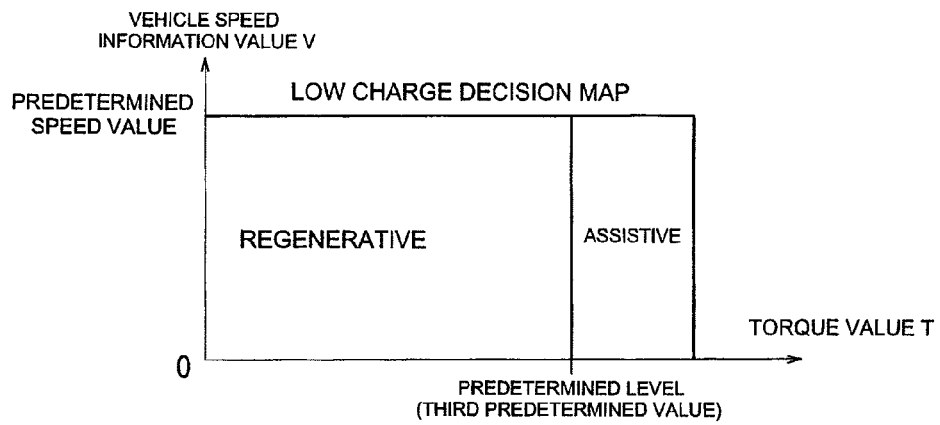
FIGS. 7A through 7C are diagrams showing decision maps stored in a decision map storage area of a storage unit, FIG. 7A showing a low charging decision map, FIG. 7B a normal decision map, and FIG. 7C a high charging decision map.
Figure 7B:
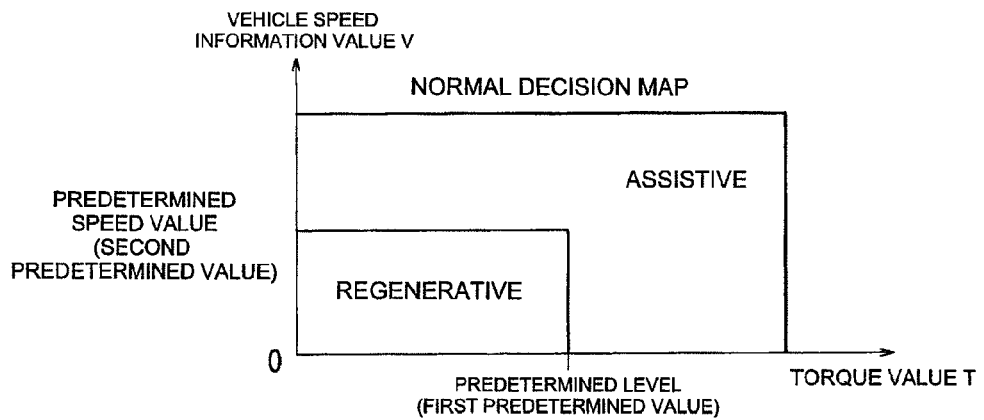
Figure 7C:
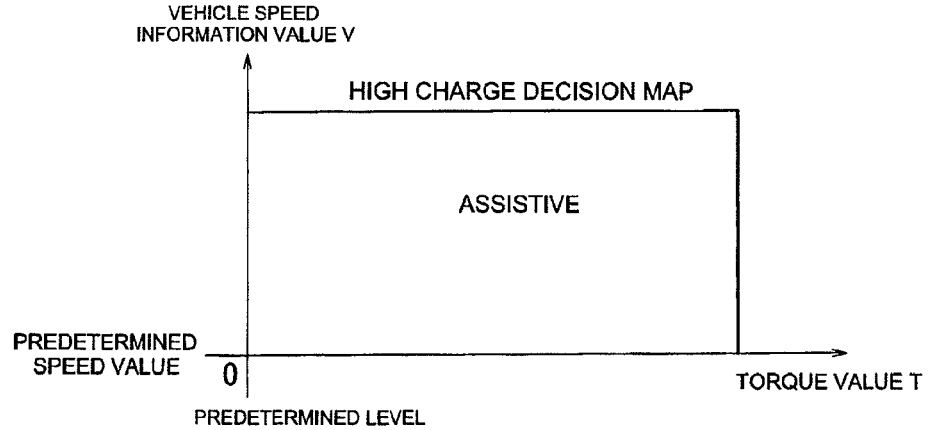
Figure 8:
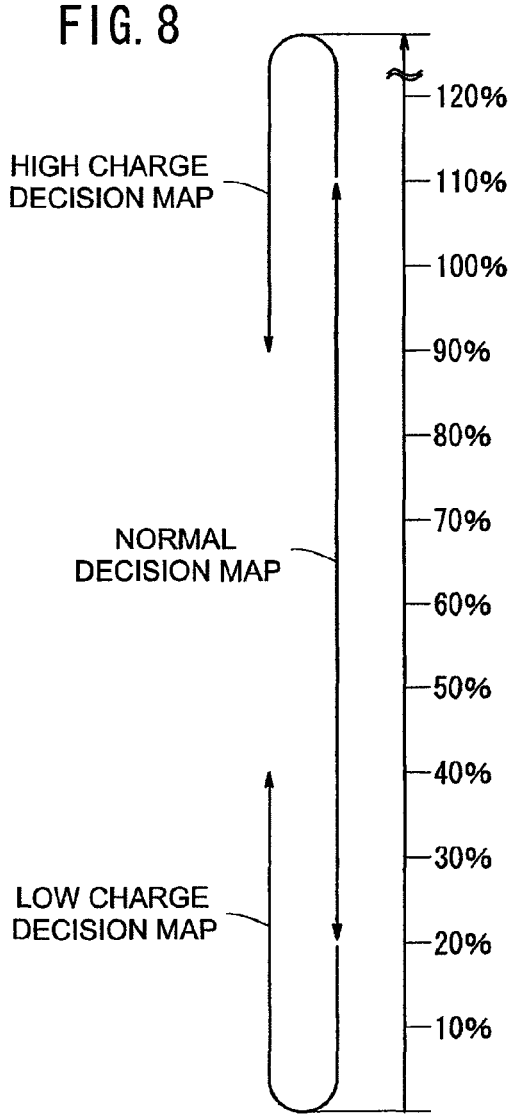
FIG. 8 is a diagram showing charged states of a battery at the time the low charging decision map, the normal decision map, and the high charging decision map are selected by a decision map selector.

FIGS. 7A through 7C are diagrams showing the decision maps stored in the decision map storage area 290 of the storage unit 252. FIG. 7A shows a low charge decision map, FIG. 7B a normal decision map, and FIG. 7C a high charge decision map. Each of the decision maps has a horizontal axis representative of torque values T and a vertical axis representative of vehicle speed information values V. FIG. 8 is a diagram showing states of charge of the battery 44 at the time the low charge decision map, the normal decision map, and the high charge decision map are selected by the decision map selector 262.

The low charge decision map is a decision map used when the SOC of the battery 44 is of a low charge level. The high charge decision map is a decision map used when the SOC of the battery 44 is of a high charge level. The normal decision map is a decision map used when the SOC of the battery 44 is of a normal charge level (other than a low charge level or a high charge level).

The low charge decision map is a decision map for performing a control process with more emphasis on the regenerative control process (a control process for switching between the assistive control process and the regenerative control process with a higher rate for the regenerative control process). The high charge decision map is a decision map for performing a control process with more emphasis on the assistive control process (a control process for switching between the assistive control process and the regenerative control process with a higher rate for the assistive control process). The normal decision map is a decision map for performing a normal control process (a control process for switching between the assistive control process and the regenerative control process).

As shown in FIG. 8, the decision map selector 262 selects the low charge decision map if the SOC of the battery 44 becomes lower than a first level (e.g., 20%) when the selected decision map is the normal decision map. The decision map selector 262 selects the normal decision map if the SOC of the battery 44 becomes higher than a second level (e.g., 40%) when the selected decision map is the low charge decision map. The decision map selector 262 selects the high charge decision map if the SOC of the battery 44 becomes higher than a third level (e.g., 110%) when the selected decision map is the normal decision map. The decision map selector 262 selects the normal decision map if the SOC of the battery 44 becomes lower than a fourth level (e.g., 90%) when the selected decision map is the high charge decision map.

The assistive control process and the regenerative control process are performed so that the SOC of the battery 44 will stay within a control target range (e.g., between 60% and 70%). The control target range is stored in the storage unit 252. Specifically, the first level and the third level are set to levels that are different from the control target range by identical differences, and the second level and the fourth levels are set to essentially medium levels of the differences. Therefore, the control process with more emphasis on the regenerative control process and the control process with more emphasis on the assistive control process are selected at similar timings with respect to the directions in which the SOC of the battery 44 increases and decreases (20% through 110%) from the control target range, so that the assistive control process and the regenerative control process will be performed without allowing the rider of the assisted bicycle 10 to feel strange about the recognition of the SOC of the battery 44. Since the second level and the fourth levels are at intermediate positions between the control target range and the first level and the third level, respectively, the frequency of switching between the control process with more emphasis on the regenerative control process and the normal control process, and the frequency of switching between the control process with more emphasis on the assistive control process and the normal control process are reduced, the remaining stored energy level of the battery 44 reaches the control target range equally from those levels.

The decision maps are maps determined for performing the assistive mode, if the torque value T is greater than a predetermined level (threshold), and performing the regenerative mode, if the torque value T is equal to or smaller than the predetermined level. Specifically, the decision maps are maps determined for performing the assistive mode, if the torque value T is greater than the predetermined level or the vehicle speed information value V is greater than a predetermined speed value, and performing the regenerative mode, if the torque value T is equal to or smaller than the predetermined level or the vehicle speed information value V is equal to or smaller than the predetermined speed value. The predetermined level and the predetermined speed value are different for the low charge decision map, the normal decision map, and the high charge decision map. The predetermined level and the predetermined speed value for the low charge decision map are highest, and the predetermined level and the predetermined speed value for the high charge decision map are lowest. Therefore, as the SOC of the battery 44 is lower, the regenerative mode is more likely to be performed.

According to the present embodiment, the predetermined level and the predetermined speed value for the high charge decision map are nil (0). Therefore, the high charge decision map is a map determined for performing the assistive mode in a full range of torque values T and vehicle speed information values V. The high charge decision map is thus effective to protect the battery 44 from being overcharged, and allows the rider of the assisted bicycle 10 to recognize that the battery 44 is fully charged from experiencing a driving feeling. According to the present embodiment, the predetermined speed value for the low charge decision map is set to a speed value (e.g., 100 km/h) that cannot be reached by the assisted bicycle 10.

The normal decision map is determined for performing the regenerative mode, if the torque value T is equal to or smaller than a first predetermined value, i.e., a predetermined level, and the vehicle speed information value V is equal to or smaller than a second predetermined value, i.e., a predetermined speed value, and performing the assistive mode, if the torque value T is greater than the first predetermined value and the vehicle speed information value V is greater than the second predetermined value. Since the assistive mode is performed when the vehicle speed is high and the pedaling force is large, and the regenerative mode is performed otherwise, the SOC of the battery 44 is highly likely to be kept within a proper range, and the battery 44 may not be or may be less frequently charged by a separate battery charger.

The low charge decision map is determined for performing the assistive mode, if the torque value T is greater than a third predetermined value, i.e., a predetermined level, and performing the regenerative mode, if the torque value T is equal to or smaller than the third predetermined value. The third predetermined value is greater than the first predetermined value. Therefore, the low charge decision map is effective to protect the battery 44 from being overcharged, and allows the rider of the assisted bicycle 10 to recognize that the SOC of the battery 44 is low from experiencing a driving feeling. Inasmuch as the predetermined speed value for the low charge decision map is a speed value that cannot be reached by the assisted bicycle 10, there is no need to take into account the vehicle speed information value V for the low charge decision map.

The decision map selector 262 thus selectively switches between the decision maps depending on the SOC of the battery 44 for thereby changing the predetermined level and the predetermined speed value.

The decision maps also store control quantities (duty ratios) of the assistive control process and the regenerative control process depending on the torque value T and the vehicle speed information value V. For example, if the torque value T is greater than the first predetermined value and the vehicle speed information value V is greater than the second predetermined value in the normal decision map, then the normal decision map stores a control quantity of the assistive control process depending on the torque value T and the vehicle speed information value V. If the torque value T is equal to or smaller than the first predetermined value and the vehicle speed information value V is equal to or smaller than the second predetermined value in the normal decision map, then the normal decision map stores a control quantity of the regenerative control process depending on the torque value T and the vehicle speed information value V.

Since the assistive control process and the regenerative control process are selected, and control quantities of the assistive control process and the regenerative control process are determined using the decision maps where the control quantities of the assistive control process and the regenerative control process depend on torque value T and the vehicle speed information value V, the assistive control process and the regenerative control process can be selected and control quantities of the assistive control process and the regenerative control process can be determined appropriately and simply.

Referring back to FIG. 6, the mode determiner 264 determines a mode to be performed from the decision map selected by the decision map selector 262, using the torque value T of the pedaling torque, which is detected by the pedaling force sensor 110 and the vehicle speed information value (vehicle speed) V of the assisted bicycle 10, which is detected by the vehicle speed sensor 66. In the present embodiment, the vehicle speed sensor 66 detects the vehicle speed information value V of the assisted bicycle 10. However, any sensor capable of detecting information representative of the vehicle speed may be employed instead of the vehicle speed sensor 66. For example, the vehicle speed sensor 66 may be replaced with a crankshaft rotational speed sensor (vehicle speed information detector) for detecting the rotational speed (vehicle speed information value V) of the crankshaft 48, and the vehicle speed of the assisted bicycle 10 is determined from the rotational speed of the crankshaft 48.

If the mode determiner 264 detects that the peak of the torque value T detected by the pedaling force sensor 110 becomes equal to or smaller than the predetermined level after the determined mode has changed from the assistive mode to the regenerative mode, then the mode determiner 264 determines that an assistive transient mode is to be performed. The assistive transient mode is a special mode for temporarily performing the assistive control process when the regenerative mode is to be performed under ordinary circumstances.

The ΔV processor 266 calculates the difference ΔV (change) between a previous vehicle speed information value V (which is a given period before the present time) detected by the vehicle speed sensor 66 and a present vehicle speed information value V. Specifically, the ΔV processor 266 calculates the difference ΔV by subtracting the previous vehicle speed information value V from the present vehicle speed information value V. If the assisted bicycle 10 is accelerated, then the difference ΔV is a positive value, and if the assisted bicycle 10 is decelerated, then the difference ΔV is a negative value.

The ΔV integrator 268 integrates positive and negative differences ΔV, which have been calculated by the ΔV processor 266. The ΔV integrator 268 integrates differences ΔV according to their signs. Specifically, the ΔV integrator 268 integrates positive differences ΔV together and integrates negative differences ΔV together, but does not integrate positive and negative differences ΔV together.

If the mode determiner 264 determines a mode to be performed as the assistive mode, then the assistive controller 270 energizes the brushless motor 160 to perform the assistive control process. Specifically, the assistive controller 270 acquires a control quantity depending on the torque value T detected by the pedaling force sensor 110 and the vehicle speed information value V detected by the vehicle speed sensor 66, from the decision map selected by the decision map selector 262, and performs the PWM control process on the driver 106 based on the acquired control quantity (duty ratio) for thereby performing the assistive control process. As the control quantity of the assistive control process increases, the assistive ratio also increases, and as the control quantity of the assistive control process decreases, the assistive ratio also decreases. As the assistive ratio increases, the ratio of an assistive torque generated by the brushless motor 160 to the pedaling torque increases.

If the mode determiner 264 determines a mode to be performed as the regenerative mode, then the regenerative controller 272 energizes the brushless motor 160 to perform the regenerative control process. Specifically, the regenerative controller 272 acquires a control quantity depending on the torque value T detected by the pedaling force sensor 110 and the vehicle speed information value V detected by the vehicle speed sensor 66, from the decision map selected by the decision map selector 262, and performs the PWM control process on the driver 106 based on the acquired control quantity (duty ratio) for thereby performing the regenerative control process. As the control quantity of the regenerative control process increases, the amount of electric energy supplied to charge the battery 44 also increases, and as the control quantity of the regenerative control process decreases, the amount of regenerated electric energy supplied to charge the battery 44 also decreases. As the control quantity of the regenerative control process increases, a regenerative braking force increases commensurately, posing an increased load on the rider who is stepping on the pedals 50L, 50R.

The ΔSOC calculator 274 calculates the difference ΔSOC between the SOC of the battery 44 at the time the power supply of the assisted bicycle 10 is turned on and the SOC of the battery 44 at the time the power supply of the assisted bicycle 10 is turned off in a previous cycle of use of the assisted bicycle 10. Specifically, the ΔSOC calculator 274 calculates the difference ΔSOC by subtracting the SOC of the battery 44 at the time the assisted bicycle 10 starts to be used (when the power supply is turned on) in a previous cycle from the SOC of the battery 44 at the time the assisted bicycle 10 ends to be used (when the power supply is turned off) in the previous cycle. The difference ΔSOC is illustrative of the state of the assistive control process (assisted state) and the state of the regenerative control process (regenerated state) in the previous cycle of use of the assisted bicycle 10. In other words, the difference ΔSOC is illustrative of the state of discharge of the battery 44 in the assistive control process and the state of charge of the battery 44 in the regenerative control process. If the difference ΔSOC is of a positive value, then it indicates that the assistive control process was performed more than the regenerative control process in the previous cycle of use of the assisted bicycle 10. If the difference ΔSOC is of a negative value, then it indicates that the regenerative control process was performed more than the assistive control process in the previous cycle of use of the assisted bicycle 10.

The control quantity corrector 276 corrects the control quantities of the assistive control process and the regenerative control process depending on the positive and negative ΔV integrated values. The control quantity corrector 276 corrects the control quantity of the regenerative control process into a reduced control quantity depending on the negative ΔV integrated value, and corrects the control quantity of the assistive control process into an increased control quantity depending on the positive ΔV integrated value.

Specifically, the control quantity corrector 276 acquires ΔV integrated value correction coefficients depending on the positive and negative ΔV integrated values from ΔV integrated value correction maps stored in the integrated value correction map storage area 292 of the storage unit 252, and multiplies the control quantities of the assistive control process and the regenerative control process by the acquired ΔV integrated value correction coefficients, thereby correcting the control quantities of the assistive control process and the regenerative control process. The assistive controller 270 and the regenerative controller 272 perform the assistive control process and the regenerative control process, respectively, according to the corrected control quantities.

The control quantity corrector 276 also corrects the control quantities of the assistive control process and the regenerative control process depending on the calculated positive and negative differences ΔSOC. The control quantity corrector 276 corrects the control quantities of the assistive control process and the regenerative control process so as to keep the SOC of the battery 44 within the control target range (60% through 70%). If the difference ΔSOC is positive, then the control quantity corrector 276 corrects the control quantity of the regenerative control process into an increased control quantity and corrects the control quantity of the assistive control process into a reduced control quantity. If the difference ΔSOC is negative, then the control quantity corrector 276 corrects the control quantity of the regenerative control process into a reduced control quantity and corrects the control quantity of the assistive control process into an increased control quantity.

Specifically, the control quantity corrector 276 acquires ΔSOC correction coefficients for the assistive control process and the regenerative control process depending on the positive and negative differences ΔSOC from ΔSOC correction maps stored in the ΔSOC correction map storage area 294 of the storage unit 252, and stores the acquired ΔSOC correction coefficients in the ΔSOC correction coefficient storage area 296 of the storage unit 252. The control quantity corrector 276 then multiplies the control quantities of the assistive control process and the regenerative control process by the acquired ΔSOC correction coefficients for the assistive control process and the regenerative control process stored in the ΔSOC correction coefficient storage area 296, thereby correcting the control quantities of the assistive control process and the regenerative control process. The assistive controller 270 and the regenerative controller 272 perform the assistive control process and the regenerative control process, respectively, according to the corrected control quantities. The ΔSOC correction maps for correcting positive and negative differences ΔSOC include ΔSOC correction coefficients for correcting the control quantities of the assistive control process and the regenerative control process, so as to keep the SOC of the battery 44 within the control target range (60% through 70%).

Figure 9A:
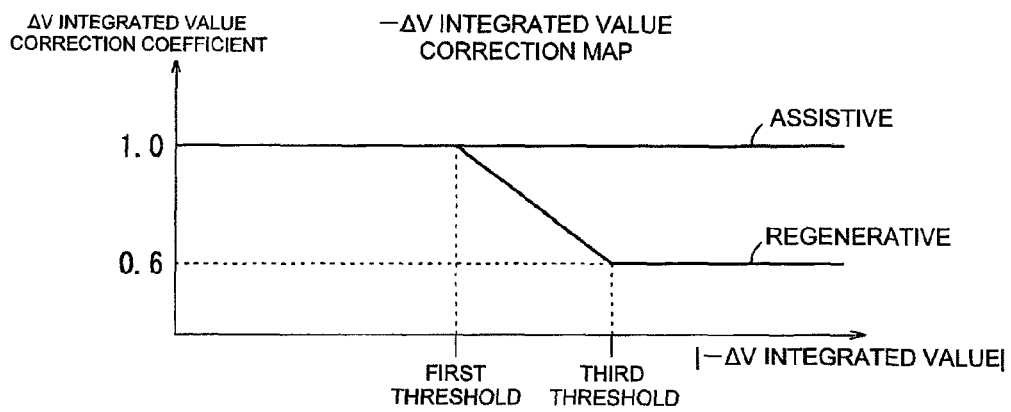
FIGS. 9A and 9B are diagrams showing ΔV integrated value correction maps stored in an integration value correction map storage area of the storage unit, FIG. 9A showing a −ΔV integration value correction map and FIG. 9B a +ΔV integration value correction map.
Figure 9B:
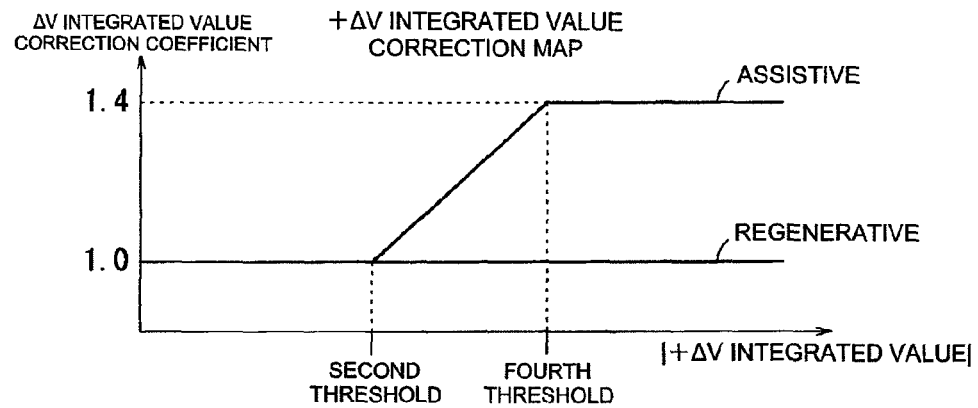

FIGS. 9A and 9B are diagrams showing ΔV integrated value correction maps stored in the integrated value correction map storage area 292 of the storage unit 252. FIG. 9A shows a −ΔV integrated value correction map and FIG. 9B a +ΔV integrated value correction map. Each of FIGS. 9A and 9B has a horizontal axis representative of the absolute values of − (negative) ΔV integrated values or + (positive) ΔV integrated values, and a vertical axis representative of ΔV integrated value correction coefficients. The −ΔV integrated value correction map is a correction map which is used when the vehicle speed of the assisted bicycle 10 is decreasing, and the ΔV integrated value correction map is a correction map which is used when the vehicle speed of the assisted bicycle 10 is increasing.

The −ΔV integrated value correction map is set such that the ΔV integrated value correction coefficient for the regenerative control process is 1.0 until the absolute value of the −ΔV integrated value becomes greater than a first threshold, is gradually reduced when the absolute value of the −ΔV integrated value becomes greater than the first threshold, and is 0.6 when the absolute value of the −ΔV integrated value becomes equal to or greater than a third threshold. The ΔV integrated value correction map for the assistive control process is set to 1.0 regardless of the −ΔV integrated value.

The +ΔV integrated value correction map is set such that the ΔV integrated value correction coefficient for the assistive control process is 1.0 until the absolute value of the +ΔV integrated value becomes greater than a second threshold, is gradually increased when the absolute value of the +ΔV integrated value becomes greater than the second threshold, and is 1.4 when the absolute value of the +ΔV integrated value becomes equal to or greater than a fourth threshold. The ΔV integrated value correction map for the regenerative control process is set to 1.0 regardless of the +ΔV integrated value.

As described above, when the ΔV integrated value is negative (when the assistive bicycle 10 is decelerated), the control quantity of the regenerative control process is corrected into a reduced control quantity depending on the absolute value of the negative ΔV integrated value. Therefore, when the rotational speed of the pedals 50L, 50R is greatly reduced due to the regenerative control process, the control quantity of the regenerative control process is reduced to suppress the reduction in the rotational speed of the pedals 50L, 50R. When the ΔV integrated value is positive (when the assistive bicycle 10 is accelerated), the control quantity of the assistive control process is corrected into an increased control quantity depending on the absolute value of the positive ΔV integrated value. Therefore, the assisted bicycle 10 is controlled in the assistive control process to quickly achieve a vehicle speed that is desired by the rider of the assisted bicycle 10. Accordingly, it is possible to reduce variations of the rotational speed of the crankshaft 48 due to switching between the assistive control process and the regenerative control process while the crankshaft 48 is rotating, so that the rider experiences a less strange feeling.

Figure 10A:
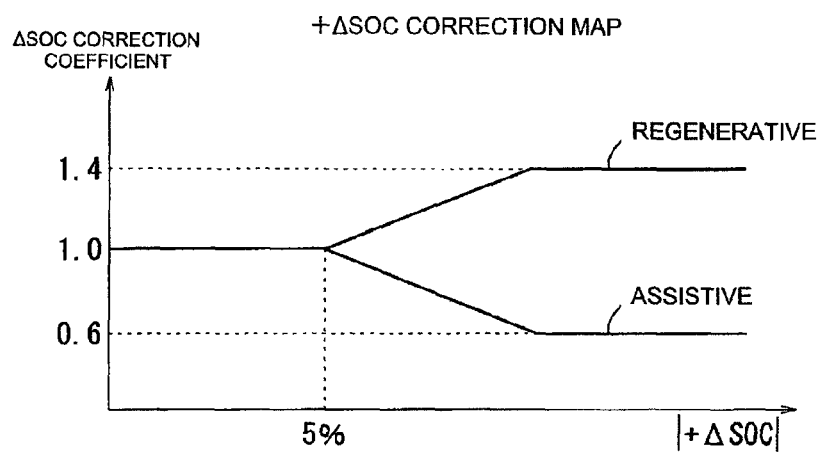
FIGS. 10A and 10B are diagrams showing ΔSOC correction maps stored in a ΔSOC correction map storage area of the storage unit, FIG. 10A showing a +ΔSOC correction map and FIG. 10B a −ΔSOC correction map.
Figure 10B:
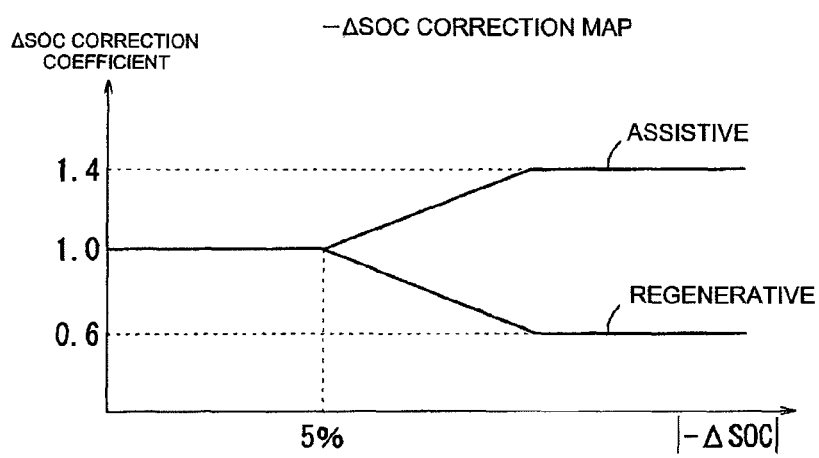

FIGS. 10A and 10B are diagrams showing ΔSOC correction maps stored in the ΔSOC correction map storage area 294 of the storage unit 252. FIG. 10A shows a +ΔSOC correction map and FIG. 10B a −ΔSOC correction map. Each of FIGS. 10A and 10B has a horizontal representative of the absolute values of + (positive) ΔSOC or − (negative) ΔSOC, and a vertical axis representative of ΔSOC correction coefficients. The +ΔSOC correction map is a correction map which is used when the calculated ΔSOC is positive, and the −ΔSOC correction map is a correction map which is used when the calculated ΔSOC is negative.

The +ΔSOC correction map is set such that the ΔSOC correction coefficient is 1.0 if the absolute value of the calculated +ΔSOC is equal to or smaller than a value (predetermined value) which is 5% of the SOC at the time the power supply is turned off in a previous cycle. The ΔSOC correction coefficient is set so as to gradually increase the control quantity of the regenerative control process and gradually reduce the control quantity of the assistive control process depending on the absolute value of the +ΔSOC, if the absolute value of the calculated +ΔSOC is greater than the value which is 5% of the SOC at the time the power supply is turned off in the previous cycle. In other words, the ΔSOC correction coefficient for the assistive control process and the ΔSOC correction coefficient for the regenerative control process are set so as to correspond to the absolute value of the +ΔSOC.

The −ΔSOC correction map is set such that the ΔSOC correction coefficient is 1.0, if the absolute value of the calculated −ΔSOC is equal to or smaller than a value (predetermined value) which is 5% of the SOC at the time the power supply is turned off in a previous cycle. The ΔSOC correction coefficient is set so as to gradually increase the control quantity of the regenerative control process and gradually reduce the control quantity of the assistive control process depending on the absolute value of the −ΔSOC, if the absolute value of the calculated −ΔSOC is greater than the value which is 5% of the SOC at the time the power supply is turned off in the previous cycle. In other words, the ΔSOC correction coefficient for the assistive control process and the ΔSOC correction coefficient for the regenerative control process are set so as to correspond to the absolute value of the −ΔSOC.

The ΔSOC correction coefficient is limited so as not to be greater than 1.4 and not to be smaller than 0.6. If the ΔSOC correction coefficient becomes 1.4 or 0.6, then the ΔSOC correction coefficient remains to be 1.4 or 0.6, even if the absolute values of the +ΔSOC and the −ΔSOC become greater.

If the ΔSOC is positive, then since the assistive control process was performed more than the regenerative control process in the previous cycle of use of the assisted bicycle 10, the control quantities are corrected into an increased control quantity of the regenerative control process and a reduced control quantity of the assistive control process by the +ΔSOC correction map, thereby keeping the SOC of the battery 44 within the control target range. If the ΔSOC is negative, then since the regenerative control process was performed more than the assistive control process in the previous cycle of use of the assisted bicycle 10, the control quantities are corrected into a reduced control quantity of the regenerative control process and an increased control quantity of the assistive control process by the −ΔSOC correction map, thereby keeping the SOC of the battery 44 within the control target range. If the absolute value of the ΔSOC falls within 5% of the SOC at the time the power supply is turned off in the previous cycle, then since the control quantities of the assistive control process and the regenerative control process are not corrected, the ΔSOC correction coefficient is prevented from varying frequently.

Referring back to FIG. 6, the assistive transient controller 278 energizes the brushless motor 160 to perform the assistive transient control process, if the mode determiner 264 determines an assistive transient mode as a mode to be performed. The assistive transient control process is a control process for energizing the brushless motor 160 at an assistive ratio, which is lower than the assistive ratio in the assistive control process, while the crankshaft 48 is revolving a given number of times (in the present embodiment, while the crankshaft 48 is making one revolution). Specifically, the assistive transient controller 278 performs the assistive transient control process by performing the PWM control process on the driver 106 for a predetermined period after the peak of the pedaling torque is detected in a present cycle, with a control quantity which is calculated by multiplying the control quantity (duty ratio) of the assistive control process which was performed when the pedaling torque had a peak in the previous cycle, by a transient coefficient (a coefficient smaller than 1) to be described later. The assistive transient controller 278 performs the assistive transient control process each time the crankshaft 48 makes one-half of a revolution.

The transient coefficient setting section 280 sets a transient coefficient to be used in the assistive transient control process. The transient coefficient setting section 280 reduces a transient coefficient that is set each time the crankshaft 48 makes one-half of a revolution. For example, the transient coefficient setting section 280 initially sets a transient coefficient to 0.8, and then sets a transient coefficient to 0.3 when the crankshaft 48 makes one-half of a revolution. The assistive torque generated by the brushless motor 160 is thus reduced by the assistive transient control process each time the crankshaft 48 makes one-half of a revolution.

The crankshaft rotational speed detector 282 serves to detect the rotational speed of the crankshaft 48. The crankshaft rotational speed detector 282 includes a counter circuit and a count value calculator (not shown). The counter circuit increments a count value in each given time (e.g., 10 msec.). The count value calculator calculates count values commensurate with one-half of a revolution of the crankshaft 48 and one revolution of the crankshaft 48 from the present vehicle speed. Specifically, since a time required for the crankshaft 48 to make one-half of a revolution is known from the present vehicle speed, the count value calculator calculates a count value commensurate with one-half of a revolution of the crankshaft 48 and a count value commensurate with one revolution of the crankshaft 48, from that time. The crankshaft rotational speed detector 282 detects when the crankshaft 48 makes one-half of a revolution and when the crankshaft 48 makes one revolution by determining whether the count value from the counter circuit reaches the calculated count values or not.

Operation in the assistive control process and the regenerative control process of the control apparatus 250 of the assisted bicycle 10 will be described below with reference to FIGS. 11 through 14. When the power switch 206 is turned on to energize the control apparatus 250 of the assisted bicycle 10, the state-of-charge state detector 260 detects the present SOC of the battery 44 (step S1 shown in FIG. 11), and stores the SOC of the battery 44 upon activation in the storage unit 252 (step S2). In step S2, the SOC of the battery 44, which is initially detected upon activation, is stored in the storage unit 252. The SOCs detected in second and subsequent cycles after activation are not stored in the storage unit 252.

Then, the decision map selector 262 determines whether the SOC of the battery 44 detected in step S1 is lower than the first level (20%) or not (step S3). If the decision map selector 262 determines in step S3 that the detected SOC of the battery 44 is not lower than the first level (20%), then the decision map selector 262 determines whether the detected SOC of the battery 44 is greater than the second level (40%) or not (step S4).

If the decision map selector 262 determines in step S4 that the detected SOC of the battery 44 is not greater than the second level (40%), then the decision map selector 262 determines whether the presently selected decision map is the normal decision map or not (step S5).

If the decision map selector 262 determines in step S3 that the detected SOC of the battery 44 is lower than the first level (20%), or if the SOC of the battery 44 is equal to or greater than the first level (20%) and equal to or lower than the second level (40%), and the decision map selector 262 determines in step S5 that the presently selected decision map is not the normal decision map, then the decision map selector 262 selects the low charge decision map (step S6). Since the low charge decision map is thus selected when the SOC of the battery 44 is low, the assistive control process and the regenerative control process can appropriately be selectively performed in a manner to match the low SOC of the battery 44.

If the decision map selector 262 determines in step S4 that the detected SOC of the battery 44 is greater than the second level (40%), then the decision map selector 262 determines whether the detected SOC of the battery 44 is lower than the fourth level (90%) or not (step S7). If the decision map selector 262 determines in step S7 that the detected SOC of the battery 44 is not lower than the fourth level (90%), then the decision map selector 262 determines whether the detected SOC of the battery 44 is greater than the third level (110%) or not (step S8).

If the decision map selector 262 determines in step S8 that the detected SOC of the battery 44 is not greater than the third level (110%), then the decision map selector 262 determines whether the presently selected decision map is the normal decision map or not (step S9). If the decision map selector 262 determines in step S8 that the detected SOC of the battery 44 is greater than the third level, or if the SOC of the battery 44 is equal to or greater than the fourth level (90%) and equal to or lower than the third level (110%), and the decision map selector 262 determines in step S9 that the presently selected decision map is not the normal decision map, then the decision map selector 262 selects the high charge decision map (step S10). Since the high charge decision map is thus selected when the SOC of the battery 44 is high, the assistive control process and the regenerative control process can appropriately be selectively performed in a manner to match the high SOC of the battery 44.

If the SOC of the battery 44 is equal to or greater than the first level and equal to or lower than the second level, and the decision map selector 262 determines in step S5 that the presently selected decision map is the normal decision map, or if the decision map selector 262 determines in step S7 that the detected SOC of the battery 44 is lower than the fourth level, or if the SOC of the battery 44 is equal to or greater than the fourth level and equal to or lower than the third level, and the decision map selector 262 determines in step S9 that the presently selected decision map is the normal decision map, then the decision map selector 262 selects the normal decision map (step S11).

As described above, if the SOC of the battery 44 becomes lower than the first level while the normal decision map is being presently selected, then the decision map selector 262 selects the low charge decision map in step S6. Subsequently, if the SOC of the battery 44 becomes greater than the second level, which is higher than the first level, then the decision map selector 262 selects the normal decision map in step S11. If the SOC of the battery 44 becomes greater than the third level while the normal decision map is being presently selected, then the decision map selector 262 selects the high charge decision map in step S10. Subsequently, if the SOC of the battery 44 becomes lower than the fourth level, which is lower than the third level, then the decision map selector 262 selects the normal decision map in step S11. Inasmuch as there is a hysteresis for switching between the decision maps (inasmuch as the SOC for switching from the normal decision map to the low charge decision map and the high charge decision map and the SOC for switching from the low charge decision map and the high charge decision map to the normal decision map are different from each other), it is possible to prevent frequent switching between the decision maps that are selected depending on the SOC.

When a decision map is selected in either one of step S6, step S10, and step S11, the pedaling force sensor 110 detects the torque value T of the pedaling torque, and the vehicle speed sensor 66 detects the vehicle speed information value V (step S12). The torque value T and the vehicle speed information value V that are detected are stored in the storage unit 252. The pedaling force sensor 110 and the vehicle speed sensor 66 may periodically detect the torque value T and the vehicle speed information value V, and the controller 108 may acquire the latest torque value T and the latest vehicle speed information value V at the time of step S12.

Then, the $\Delta V$ processor 266 calculates the difference $\Delta V$ between vehicle speed information values V (step S13). Specifically, the $\Delta V$ processor 266 calculates the difference $\Delta V$ between a previous vehicle speed information value V (which is a given period before the present time) and a present vehicle speed information value V. The calculated difference $\Delta V$ is stored in the storage unit 252.

Then, the $\Delta V$ integrator 268 determines whether the positive or negative difference $\Delta V$ calculated in step S13 has been inverted or not (step S14). In other words, the $\Delta V$ integrator 268 determines whether the positive or negative sign of the previously calculated difference $\Delta V$ and the positive or negative sign of the presently calculated difference $\Delta V$ has been inverted or not.

Figure 12:
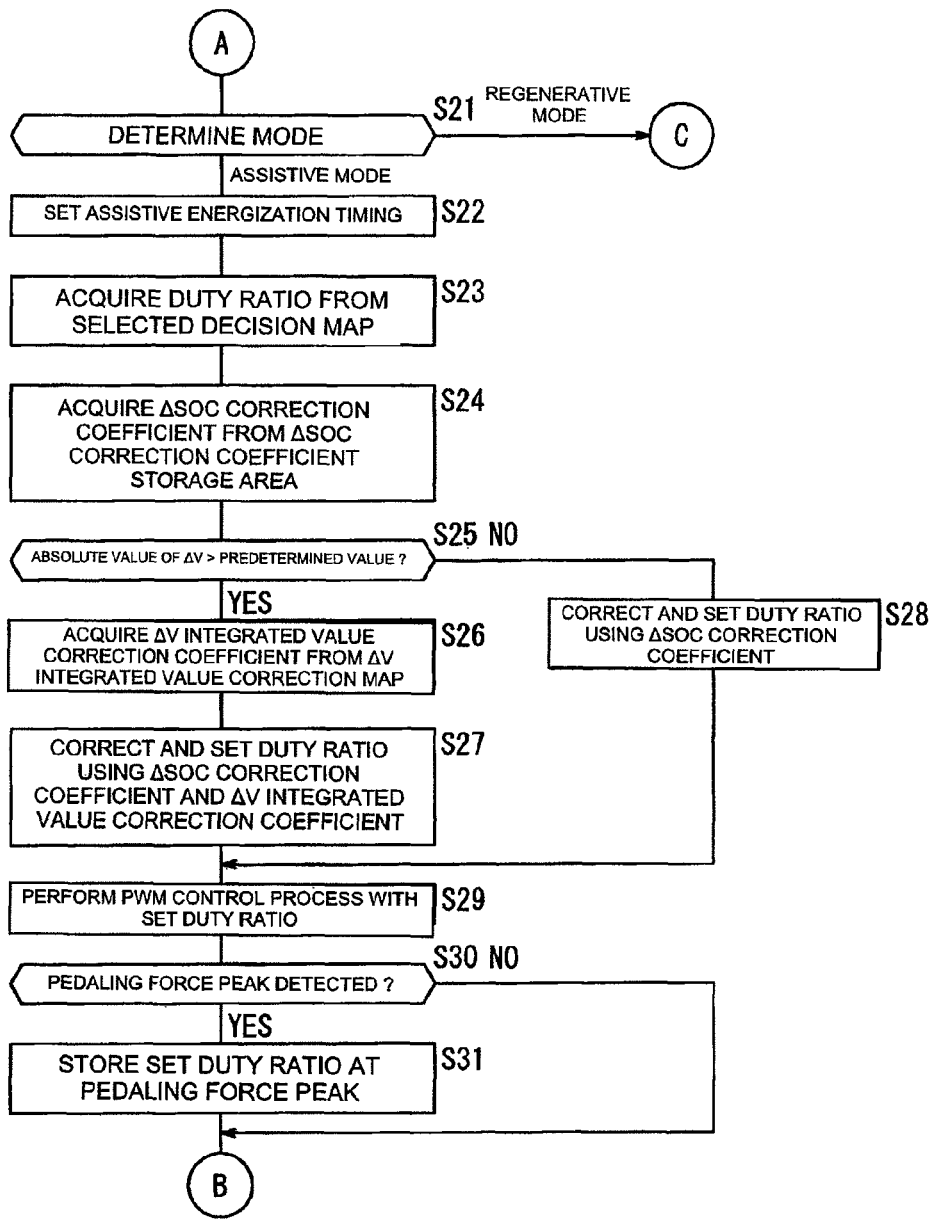
FIG. 12 is a flowchart of an operation sequence of the assistive control process and the regenerative control process, which are carried out by the control apparatus for the assisted bicycle.

If the $\Delta V$ integrator 268 determines in step S14 that the positive or negative difference $\Delta V$ has not been inverted, then the ΔV integrator 268 integrates the presently calculated difference ΔV (step S15), and control goes to step S21 shown in FIG. 12. In other words, the ΔV integrator 268 adds the presently calculated difference ΔV to the ΔV integrated value which has already been integrated. The newly calculated ΔV integrated value is stored in the storage unit 252. If the ΔV integrator 268 determines in step S14 that the positive or negative difference ΔV has been inverted, on the other hand, then the ΔV integrator 268 resets the ΔV integrated value, which has already been integrated (step S16), and control goes to step S21 shown in FIG. 12. If the ΔV integrated value is reset, then the presently calculated difference ΔV serves as a ΔV integrated value. In step S16, the ΔV integrated value stored in the storage unit 252 is deleted, and the presently calculated difference ΔV is stored as a ΔV integrated value in the storage unit 252.

In step S21, the mode determiner 264 determines a mode to be performed from the latest decision map selected by the decision map selector 262, using the torque value T of the pedaling torque and the vehicle speed information value V, which represents the vehicle speed of the assisted bicycle 10, that are detected in step S12. Specifically, the mode determiner 264 determines which one of the assistive mode and the regenerative mode is to be performed, from the latest decision map selected in either one of step S6, step S10, and step S11.

For example, if the low charge decision map is selected, then the mode determiner 264 determines that the regenerative mode is to be performed when the detected torque value T is equal to or smaller than the predetermined level (the third predetermined value), and determines that the assistive mode is to be performed when the detected torque value T is greater than the predetermined level. If the high charge decision map is selected, then the mode determiner 264 determines that the assistive mode is to be performed when the torque value T is detected. If the normal decision map is selected, then the mode determiner 264 determines that the assistive mode is to be performed when the detected torque value T is greater than the predetermined level (the first predetermined value) or when the vehicle speed information value V is greater than the second predetermined value, and determines that the regenerative mode is to be performed when the detected torque value T is equal to or lower than the predetermined level (the first predetermined value) and when the vehicle speed information value V is equal to or lower than the second predetermined value.

If the assistive mode is determined as the mode to be performed in step S21, then the assistive controller 270 sets an assistive energization timing to supply electric current to the stator coils in U, V, W phases of the brushless motor 160 depending on the angular displacement of the brushless motor 160, which is detected by the magnetic pole sensor 162 (step S22). The controller 108 then performs the PWM control process on the driver 106 based on the assistive energization timing.

Then, the assistive controller 270 acquires a duty ratio (control quantity) of the assistive control process from the latest decision map that is selected, using the latest torque value T and the latest vehicle speed information value V which are detected (step S23).

Then, the control quantity corrector 276 acquires the ΔSOC correction coefficient for the assistive control process, which is stored in the ΔSOC correction coefficient storage area 296 of the storage unit 252 (step S24). An operation sequence for storing the ΔSOC correction coefficient for the assistive control process in the ΔSOC correction coefficient storage area 296 will be described later.

Then, the control quantity corrector 276 determines whether the absolute value of the latest difference ΔV calculated in step S13 is greater than a predetermined value (e.g., 1 km/h) or not (step S25).

Figure 11:
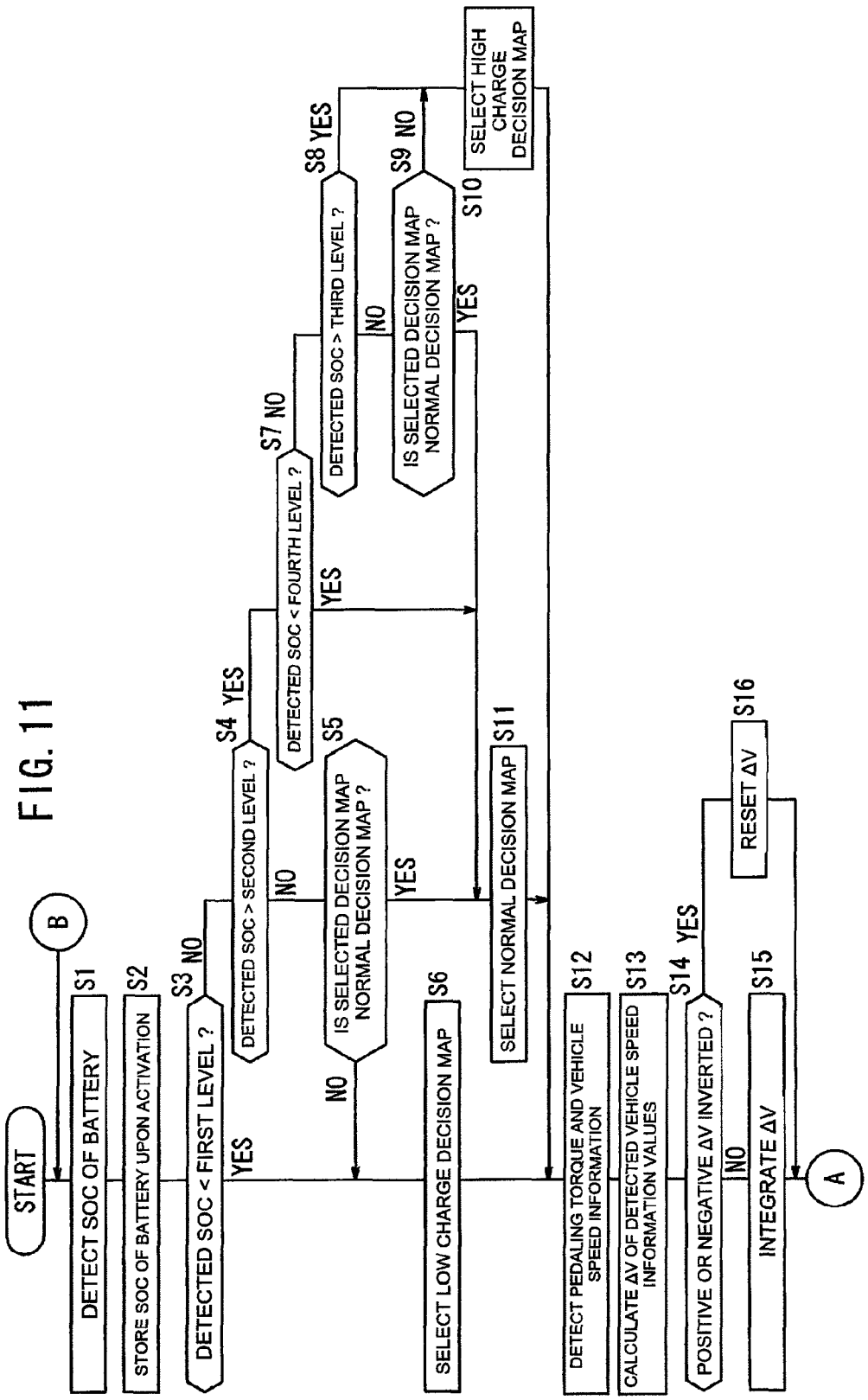
FIG. 11 is a flowchart of an operation sequence of an assistive control process and a regenerative control process, which are carried out by the control apparatus for the assisted bicycle.

If the control quantity corrector 276 determines in step S25 that the absolute value of the difference ΔV is greater than the predetermined value, then the control quantity corrector 276 acquires, from the ΔV integrated value correction maps, ΔV integrated value correction coefficients for the assistive control process based on the absolute value of the ΔV integrated value presently stored in the storage unit 252 (the ΔV integrated value calculated and stored in step S15 shown in FIG. 11 or the ΔV integrated value stored in step S16 shown in FIG. 11)(step S26). If the ΔV integrated value is negative, then the control quantity corrector 276 acquires, from the −ΔV integrated value correction map, a ΔV integrated value correction coefficient for the assistive control process, which corresponds to the absolute value of the negative (−) ΔV integrated value stored in the storage unit 252. If the ΔV integrated value is positive, then the control quantity corrector 276 acquires, from the +ΔV integrated value correction map, a ΔV integrated value correction coefficient for the assistive control process, which corresponds to the absolute value of the positive (+) ΔV integrated value stored in the storage unit 252.

Then, the control quantity corrector 276 corrects the duty ratio of the assistive control process acquired in step S23, using the ΔSOC correction coefficient for the assistive control process that was acquired in step S24, and the ΔV integrated value correction coefficient for the assistive control process that was acquired in step S26, and sets the corrected duty ratio as the duty ratio of the assistive control process (step S27), after which control goes to step S29. Specifically, the control quantity corrector 276 corrects the duty ratio of the assistive control process by multiplying the duty ratio of the assistive control process acquired in step S23 by the ΔSOC correction coefficient for the assistive control process that was acquired in step S24 and the ΔV integrated value correction coefficient for the assistive control process that was acquired in step S26. Accordingly, the corrected duty ratio of the assistive control process is expressed by the equation: the corrected duty ratio of the assistive control process=the duty ratio of the assistive control process× the ΔSOC correction coefficient for the assistive control process× the ΔV integrated value correction coefficient for the assistive control process.

If the control quantity corrector 276 determines in step S25 that the absolute value of the difference ΔV is not greater than the predetermined value, then the control quantity corrector 276 corrects and sets the duty ratio of the assistive control process acquired in step S23, using the ΔSOC correction coefficient for the assistive control process that was acquired in step S24 (step S28), after which control goes to step S29. Specifically, the control quantity corrector 276 corrects the duty ratio of the assistive control process by multiplying the duty ratio of the assistive control process acquired in step S23 by the ΔSOC correction coefficient for the assistive control process that was acquired in step S24. Accordingly, the corrected duty ratio of the assistive control process is expressed by the equation: the corrected duty ratio of the assistive control process=the duty ratio of the assistive control process× the ΔSOC correction coefficient for the assistive control process.

As indicated by the −ΔV integrated value correction map shown in FIG. 9A, when the ΔV integrated value is negative (when the assistive bicycle 10 is decelerated), since the ΔV integrated value correction coefficient for the assistive control process is kept at 1.0, the duty ratio of the assistive control process is not corrected by the ΔV integrated value correction coefficient. On the other hand, as indicated by the +ΔV integrated value correction map shown in FIG. 9B, when the ΔV integrated value is positive (when the assistive bicycle 10 is accelerated), since the ΔV integrated value correction coefficient for the assistive control process becomes greater than 1.0 as the absolute value of the ΔV integrated value is greater than the second threshold, the duty ratio of the assistive control process is corrected into an increased duty ratio. The increased duty ratio of the assistive control process increases the assistive ratio, resulting in an increase in the ratio of the assistive torque to the pedaling torque.

If the absolute value of the +ΔV integrated value is not greater than the second threshold, then the duty ratio is not corrected, because, if the absolute value of the +ΔV integrated value is not greater than the second threshold, it is uncertain if the rider of the assisted bicycle 10 is stepping on the pedals 50L, 50R in order to accelerate the bicycle 10 or not, and hence the assistive ratio is prevented from increasing against the intention of the rider.

In step S25, the control quantity corrector 276 determines whether the absolute value of the difference ΔV is greater than the predetermined value. If the absolute value of the difference ΔV is not greater than the predetermined value, then the duty ratio is not corrected based on the ΔV integrated value correction coefficient, because, if the absolute value of the difference ΔV is equal to or smaller than the predetermined value, the vehicle speed is subject to small variations, and the drivability of the assisted bicycle 10 is lowered, if the duty ratio is corrected when the vehicle speed is subject to small variations.

In step S29, the assistive controller 270 performs the PWM control process on the driver 106 with the set duty ratio. At this time, the assistive controller 270 performs the PWM control process on the driver 106 based on the assistive energization timing set in step S22. According to the PWM control process, the DC electric power supplied from the battery 44 is converted by the driver 106 into three-phase AC electric power, which is supplied to the brushless motor 160 to energize the brushless motor 160.

Then, the assistive controller 270 determines whether a peak of the torque value T detected by the pedaling force sensor 110 is detected or not (step S30). A peak of the torque value T can be detected by determining whether the torque value T detected in a present cycle is smaller than the torque value T detected in a previous cycle when the detected torque value T is gradually increasing. If the torque value T detected in the present cycle is smaller than the torque value T detected in the previous cycle, then the torque value T detected in the previous cycle serves as a peak thereof.

If the assistive controller 270 determines in step S30 that a peak of the torque value T is detected, then the assistive controller 270 stores the set duty ratio at the peak of the pedaling torque in the storage unit 252 (step S31). In other words, since the torque value T detected in the previous cycle has its peak, the duty ratio set in the previous cycle is stored in the storage unit 252. Then, control goes back to step S1 shown in FIG. 11. On the other hand, if the assistive controller 270 determines in step S30 that no peak of the torque value T is detected, then control goes from step S30 back to step S1.

Figure 13:
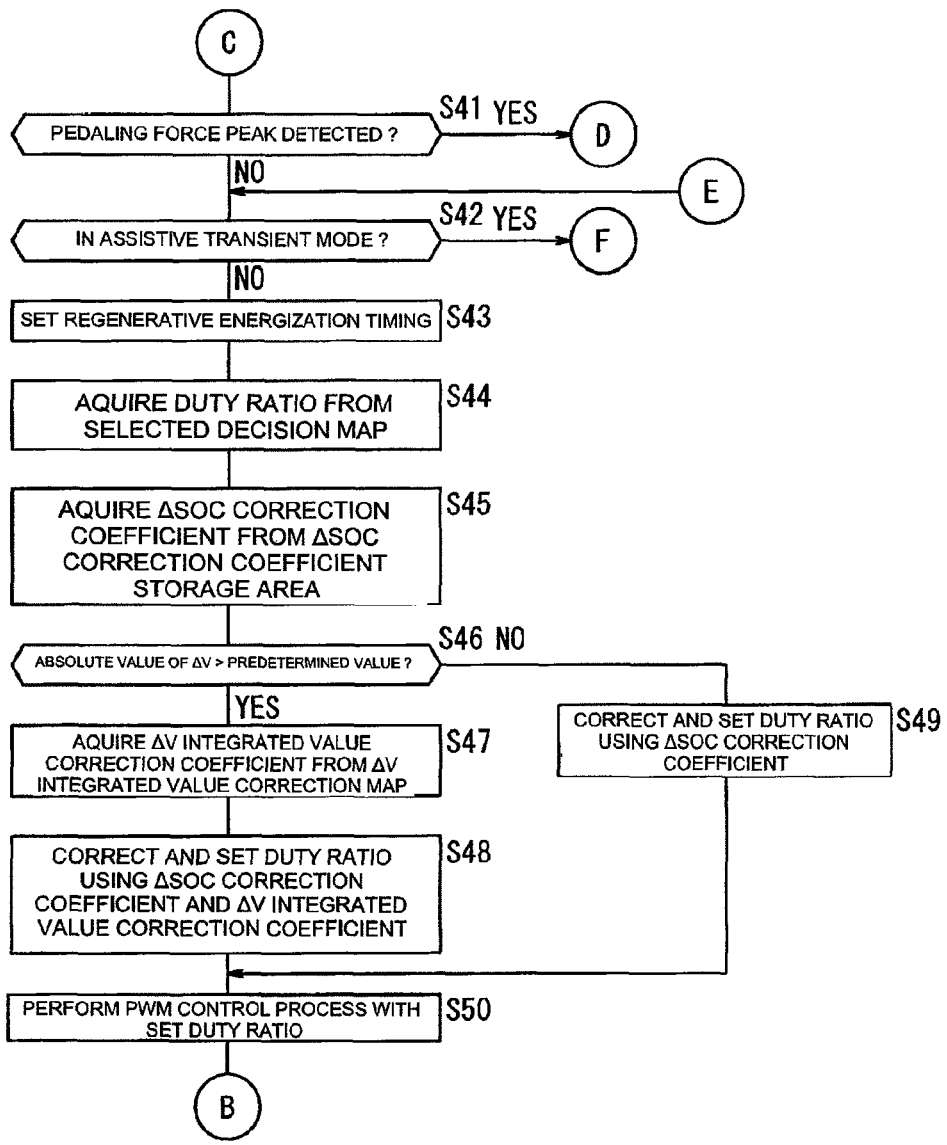
FIG. 13 is a flowchart of an operation sequence of the assistive control process and the regenerative control process, which are carried out by the control apparatus for the assisted bicycle.

If the regenerative mode is determined as the mode to be performed in step S21, then control goes to step S41 shown in FIG. 13 in which the mode determiner 264 determines whether a peak of the torque value T detected by the pedaling force sensor 110 is detected or not.

If the mode determiner 264 determines in step S41 that no peak of the torque value T of the pedaling torque is detected, the mode determiner 264 determines whether the assistive transient mode is being presently performed or not (step S42). If the mode determiner 264 determines in step S42 that the assistive transient mode is presently performed, then control goes to step S57 shown in FIG. 14. If the mode determiner 264 determines in step S42 that the assistive transient mode is not presently performed, then the regenerative controller 272 sets a regenerative energization timing to supply electric current to the stator coils in U, V, W phases of the brushless motor 160 depending on the angular displacement of the brushless motor 160, which is detected by the magnetic pole sensor 162 (step S43). The controller 108 then performs the PWM control process on the driver 106 based on the regenerative energization timing.

Then, the regenerative controller 272 acquires a duty ratio of the regenerative control process from the latest decision map, which is selected, using the latest torque value T and the latest vehicle speed information value V that are detected (step S44).

Then, the control quantity corrector 276 acquires the ΔSOC correction coefficient for the regenerative control process, which is stored in the ΔSOC correction coefficient storage area 296 of the storage unit 252 (step S45). An operation sequence for storing the ΔSOC correction coefficient for the regenerative control process in the ΔSOC correction coefficient storage area 296 will be described later.

Then, the control quantity corrector 276 determines whether the absolute value of the latest difference ΔV calculated in step S13 is greater than a predetermined value (e.g., 1 km/h) or not (step S46).

If the control quantity corrector 276 determines in step S46 that the absolute value of the difference ΔV is greater than the predetermined value, then the control quantity corrector 276 acquires, from the ΔV integrated value correction maps, ΔV integrated value correction coefficients for the regenerative control process based on the absolute value of the ΔV integrated value presently stored in the storage unit 252 (the ΔV integrated value calculated and stored in step S15 shown in FIG. 11 or the ΔV integrated value stored in step S16 shown in FIG. 11) (step S47). If the ΔV integrated value is negative, then the control quantity corrector 276 acquires, from the −ΔV integrated value correction map, a ΔV integrated value correction coefficient for the regenerative control process, which corresponds to the absolute value of the negative (−) ΔV integrated value stored in the storage unit 252. If the ΔV integrated value is positive, then the control quantity corrector 276 acquires, from the +ΔV integrated value correction map, a ΔV integrated value correction coefficient for the regenerative control process, which corresponds to the absolute value of the positive (+) ΔV integrated value stored in the storage unit 252.

Then, the control quantity corrector 276 corrects the duty ratio of the regenerative control process acquired in step S44, using the ΔSOC correction coefficient for the regenerative control process that was acquired in step S45 and the ΔV integrated value correction coefficient for the regenerative control process that was acquired in step S47, and sets the corrected duty ratio as the duty ratio of the regenerative control process (step S48), after which control goes to step S50. Specifically, the control quantity corrector 276 corrects the duty ratio of the regenerative control process by multiplying the duty ratio of the regenerative control process acquired in step S44 by the ΔSOC correction coefficient for the regenerative control process that was acquired in step S45 and the ΔV integrated value correction coefficient for the regenerative control process that was acquired in step S47. Accordingly, the corrected duty ratio of the regenerative control process is expressed by the equation: the corrected duty ratio of the regenerative control process=the duty ratio of the regenerative control process× the ΔSOC correction coefficient for the regenerative control process× the ΔV integrated value correction coefficient for the regenerative control process.

On the other hand, if the control quantity corrector 276 determines in step S46 that the absolute value of the difference ΔV is not greater than the predetermined value, then the control quantity corrector 276 corrects and sets the duty ratio of the regenerative control process acquired in step S44, using the ΔSOC correction coefficient for the regenerative control process that was acquired in step S45 (step S49), after which control goes to step S50. Specifically, the control quantity corrector 276 corrects the duty ratio of the regenerative control process by multiplying the duty ratio of the regenerative control process acquired in step S44 by the ΔSOC correction coefficient for the regenerative control process that was acquired in step S45. Accordingly, the corrected duty ratio of the regenerative control process is expressed by the equation: the corrected duty ratio of the regenerative control process=the duty ratio of the regenerative control process× the ΔSOC correction coefficient for the regenerative control process.

In step S46, the control quantity corrector 276 determines whether the absolute value of the difference ΔV is greater than the predetermined value. If the absolute value of the difference ΔV is not greater than the predetermined value, then the duty ratio is not corrected based on the ΔV integrated value correction coefficient, because, if the absolute value of the difference ΔV is equal to or smaller than the predetermined value, the vehicle speed is subject to small variations, and the drivability of the assisted bicycle 10 is lowered, if the duty ratio is corrected when the vehicle speed is subject to small variations.

As indicated by the −ΔV integrated value correction map shown in FIG. 9A, when the ΔV integrated value is negative (when the assistive bicycle 10 is decelerated), since the ΔV integrated value correction coefficient for the regenerative control process becomes smaller than 1.0 as the absolute value of the ΔV integrated value is greater than the first threshold, the duty ratio of the regenerative control process is corrected into a reduced duty ratio. Even when the rotational speed of the pedals 50L, 50R is reduced by a regenerative braking force generated in the regenerative control process, the control quantity of the regenerative control process is reduced to prevent the rotational speed of the pedals 50L, 50R from being reduced. On the other hand, as indicated by the +ΔV integrated value correction map shown in FIG. 9B, when the ΔV integrated value is positive (when the assistive bicycle 10 is accelerated), since the ΔV integrated value correction coefficient for the regenerative control process is kept at 1.0, the duty ratio of the regenerative control process is not corrected by the ΔV integrated value correction coefficient. If the absolute value of the −ΔV integrated value is not greater than the first threshold, then the duty ratio is not corrected, because, if the absolute value of the −ΔV integrated value is not greater than the first threshold, it is uncertain if the rotational speed of the pedals 50L, 50R is reduced or not, and hence the amount of regenerated electric power supplied to charge the battery 44 is prevented from being reduced.

In step S50, the regenerative controller 272 performs the PWM control process on the driver 106 with the set duty ratio. Then, control goes back to step S1 shown in FIG. 11. At this time, the regenerative controller 272 performs the PWM control process on the driver 106 based on the regenerative energization timing set in step S43. According to the PWM control process, the three-phase AC electric power generated by the brushless motor 160 is converted by the driver 106 into DC electric power, which is supplied to the battery 44.

Figure 14:
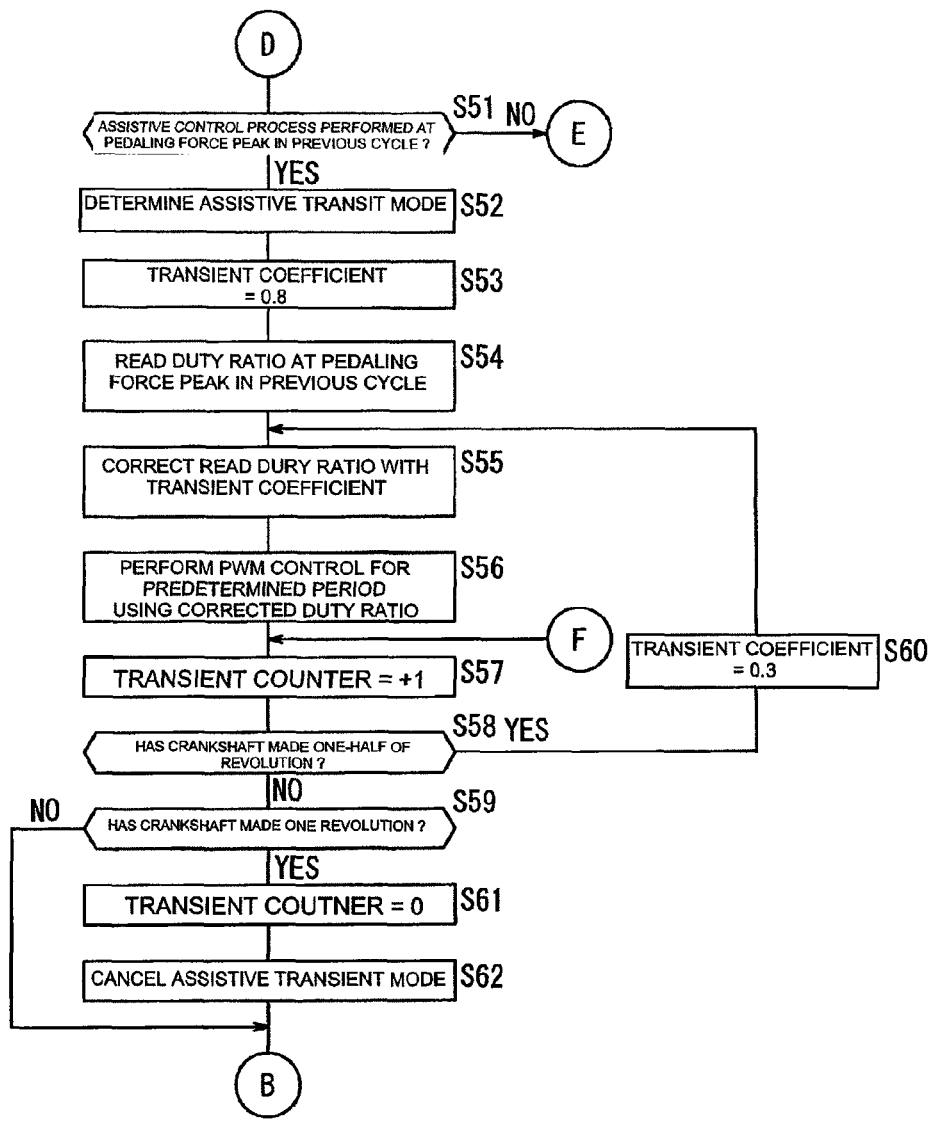
FIG. 14 is a flowchart of an operation sequence of the assistive control process and the regenerative control process, which are carried out by the control apparatus for the assisted bicycle.

If the regenerative mode is determined as the mode to be performed and a peak of the torque value T of the pedaling torque is detected in step S41 shown in FIG. 13, then control goes to step S51 shown in FIG. 14 in which the mode determiner 264 determines whether the assistive control process was performed at the time the torque value T had its peak in the previous cycle or not.

If the mode determiner 264 determines in step S51 that the assistive control process was not performed at the time the torque value T had its peak in the previous cycle, i.e., if the mode determiner 264 determines that the regenerative control process or the assistive transient control process was performed at the time the torque value T had its peak in the previous cycle, then control goes back to step S42 shown in FIG. 13. If the mode determiner 264 determines that the assistive control process was performed, then control goes to step S52 in which the mode determiner 264 determines the assistive transient mode as the mode to be performed. Then, the transient coefficient setting section 280 sets a transient coefficient of 1.0 or smaller (0.8 in the present embodiment) (step S53).

Then, the assistive transient controller 278 reads the duty ratio of the assistive control process, which was performed when the torque value T had its peak in the previous cycle, from the storage unit 252 (step S54), and corrects the read duty ratio of the assistive control process with the transient coefficient set in step S53 (step S55). Specifically, the assistive transient controller 278 corrects the duty ratio of the assistive control process by multiplying the duty ratio by the set transient coefficient.

Then, the assistive transient controller 278 performs the PWM control process on the driver 106 with the corrected duty ratio for a predetermined period (step S56), after which control goes to step S57. The assistive transient controller 278 may set an assistive transient energization timing and may performs the PWM control process based on the assistive transient energization timing. According to the PWM control process, for a predetermined period, the driver 106 converts a direct current from the battery 44 into three-phase alternating current, which is supplied to the brushless motor 160 to energize the brushless motor 160.

In step S57, the crankshaft rotational speed detector 282 increments the count value. Specifically, the crankshaft rotational speed detector 282 increments the count value in each given time. If the given time (e.g., 10 msec.) has not elapsed from the time the crankshaft rotational speed detector 282 incremented the count value in the previous cycle, the crankshaft rotational speed detector 282 does not increment the count value and waits until the given time has elapsed.

Then, the crankshaft rotational speed detector 282 determines whether the present time is the time at which the crankshaft 48 has made one-half of a revolution or not based on the present count value (step S58). If the crankshaft rotational speed detector 282 determines in step S58 that whether the present time is not the time at which the crankshaft 48 has made one-half of a revolution, then the crankshaft rotational speed detector 282 determines whether the present time is the time at which the crankshaft 48 has made one revolution or not (step S59). If the crankshaft rotational speed detector 282 determines in step S59 that whether the present time is not the time at which the crankshaft 48 has made one revolution, then control goes back to step S1 shown in FIG. 11.

On the other hand, if the crankshaft rotational speed detector 282 determines in step S58 that whether the present time is the time at which the crankshaft 48 has made one-half of a revolution, then the transient coefficient setting section 280 sets a transient coefficient (0.3 in the present embodiment), which is smaller than the previously set transient coefficient (step S60). Then, control goes back to step S55. In this manner, the duty ratio read in step S53 is corrected with the newly set transient coefficient (0.3) (step S55), and the PWM control process is performed with the newly corrected duty ratio for a predetermined period (step S56).

If the crankshaft rotational speed detector 282 determines in step S59 that the crankshaft 48 has made one revolution, then the crankshaft rotational speed detector 282 resets the count value (step S61), and the mode determiner 264 cancels the assistive transient mode (step S62), after which control goes back to step S1 shown in FIG. 11. If the mode determiner 264 determines that the assistive mode is to be performed in step S21 shown in FIG. 12 during the assistive transient mode (if a torque value T of the pedaling torque greater than the predetermined level is detected), the crankshaft rotational speed detector 282 also resets the count value, and the mode determiner 264 also cancels the assistive transient mode, after which control goes back to step S22 shown in FIG. 22.

Figure 15:
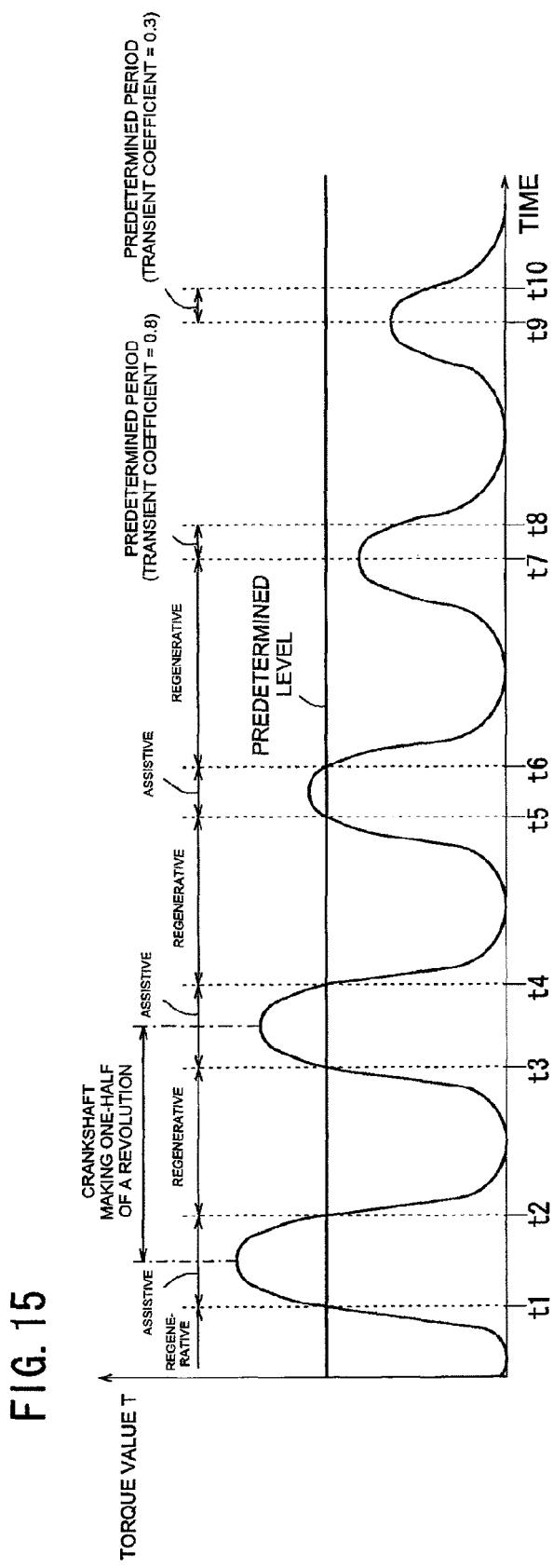
FIG. 15 is a diagram showing torque values T, which are detected by a pedaling force sensor while the rider is driving the assisted bicycle by pedaling.

FIG. 15 is a diagram showing torque values T that are detected by the pedaling force sensor 110 while the rider is driving the assisted bicycle 10 by stepping on the pedals 50L, 50R. Torque values T detected by the pedaling force sensor 110 are different depending on the angular position of the crankshaft 48 (crankshaft angular position). FIG. 15 has a horizontal axis representative of time and a vertical axis of torque values T. As shown in FIG. 15, the pedaling torque that is detected is represented by a waveform, which includes a peak torque value T each time the crankshaft 48 makes one-half of a revolution. For illustrative purposes, the predetermined level in FIG. 15 is a level used when the low charge decision map is selected as a decision map.

When the torque value T is equal to or smaller than the predetermined level, the regenerative mode is determined as the mode to be performed. Therefore, the regenerative control process is performed while the torque value T is equal to or smaller than the predetermined level. When the torque value T is greater than the predetermined level, the assistive mode is determined as the mode to be performed. Therefore, the assistive control process is performed while the torque value T is greater than the predetermined level. In the assistive control process and the regenerative control process, the duty ratio is determined based on the torque value T and the vehicle speed information value V that are detected. The duty ratio is corrected based on the ΔSOC correction coefficient and the ΔV integrated value correction coefficient which are depending on the state of the difference ΔSOC and the state of the ΔV integrated value, and the PWM control process is performed with the corrected duty ratio.

As shown in FIG. 15, the detected torque value T is gradually reduced with time, and the peak of the fourth pedaling torque is lower than the predetermined level. Therefore, the regenerative control process is performed when the peak of the fourth pedaling torque is detected. Up to the fourth pedaling torque, however, the assistive control process and the regenerative control process are alternately performed such that the regenerative control process is performed in the vicinity of the minimum torque value T and the assistive control process is performed in the vicinity of the maximum torque value T. If the regenerative control process is unexpectedly performed in the vicinity of the maximum torque value T of the fourth pedaling torque, i.e., if the regenerative control process is performed over a full range of torque values T from the minimum torque value T to the maximum torque value T, then the pedals 50L, 50R become abruptly sluggish, posing an increased load on the rider of the assisted bicycle 10 and making the rider experience a strange feeling. This shortcoming is caused not only by the regenerative control process, which is unexpectedly performed while the assistive control process and the regenerative control process are alternately performed, but also by the regenerative control process, which is unexpectedly performed over a full range of torque values T from the minimum torque value T to the maximum torque value T while the assistive control process is performed over a full range of torque values T from the minimum torque value T to the maximum torque value T.

To avoid the above shortcoming, if the peak of the torque value T detected by the pedaling force sensor 110 becomes equal to or smaller than the predetermined level for the first time after the assistive mode has switched to the regenerative mode, then the assistive transient control process, which is a special assistive control process with a reduced assistive ratio, is performed while the crankshaft 48 is making a predetermined number of revolutions (one revolution in the present embodiment). Specifically, if the peak of the torque value T detected by the pedaling force sensor 110 becomes equal to or smaller than the predetermined level for the first time after the assistive mode has switched to the regenerative mode, then the PWM control process is performed for a predetermined period on the driver 106 with a duty ratio which is calculated by multiplying the control quantity (duty ratio) of the assistive control process at the peak of the torque value T detected in the previous cycle by a transient coefficient less than 1 (0.8 in the present embodiment). In other words, if the peak of the torque value T is detected as being equal to or smaller than the predetermined level, then AC electric power is supplied to the brushless motor 160 to energize the brushless motor 160 for a predetermined period from the detection of the peak of the torque value T. Therefore, the assisted bicycle 10 is assisted in its travel for the predetermined period.

Thereafter, if the crankshaft 48 makes one-half of a revolution from the time when the peak of the torque value T becomes equal to or smaller than the predetermined level and the assistive mode is not performed, then the PWM control process is performed on the driver 106 with a duty ratio, which is calculated by multiplying the control quantity of the assistive control process by a transient coefficient, which is much less than the previous transient coefficient (0.3 in the present embodiment). In other words, when the crankshaft 48 has made one-half of a revolution from the time at which the peak of the torque value T is detected as being equal to or smaller than the predetermined level, AC electric power is supplied to the brushless motor 160 to energize the brushless motor 160 for a predetermined period from the time at which the crankshaft 48 has made one-half of a revolution.

When the crankshaft 48 has made one revolution from the time at which the peak of the torque value T is detected as being equal to or smaller than the predetermined level, the assistive transient mode is canceled. If the torque value T of the pedaling torque is equal to or smaller than the predetermined level, then the regenerative mode is performed.

Figure 16:
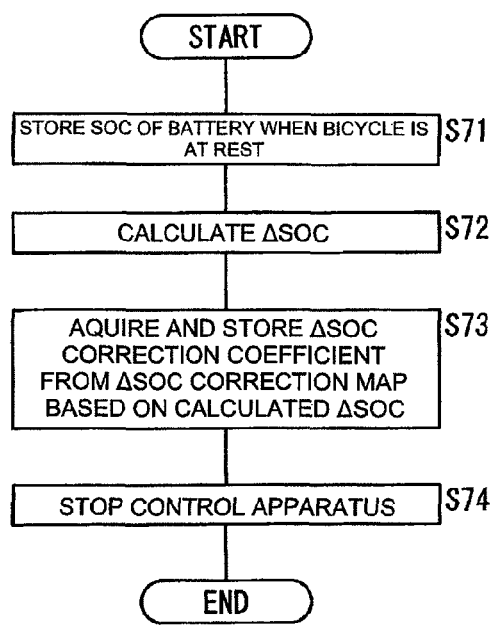
FIG. 16 is a flowchart of an operation sequence performed by the control apparatus for stopping the assisted bicycle.

An operation sequence of the control apparatus 250 for stopping the assisted bicycle 10 will be described below with reference to a flowchart shown in FIG. 16. When the power switch 206 is turned off, the state-of-charge detector 260 stores the SOC of the battery 44, which was detected immediately before the power switch 206 is turned off, in the storage unit 252 (step S71).

Then, the ΔSOC calculator 274 calculates the difference ΔSOC between the SOC of the battery 44, stored in the storage unit 252, at the time the control apparatus 250 is activated, i.e., at the time the assisted bicycle 10 starts to be used, (the SOC stored in step S2 shown in FIG. 11), and the SOC of the battery 44 at the time the control apparatus 250 is inactivated, i.e., at the time the assisted bicycle 10 ends to be used (step S72). Specifically, the ΔSOC calculator 274 calculates the difference ΔSOC by subtracting the SOC of the battery 44 at the time the control apparatus 250 is inactivated from the SOC of the battery 44 at the time the control apparatus 250 is activated. Accordingly, the difference ΔSOC is expressed by the equation: the difference ΔSOC=the SOC of the battery 44 at the time the control apparatus 250 is activated−the SOC of the battery 44 at the time the control apparatus 250 is inactivated.

Then, based on the calculated difference ΔSOC, the control quantity corrector 276 acquires ΔSOC correction coefficients from ΔSOC correction maps and stores them in the ΔSOC correction coefficient storage area 296 of the storage unit 252 (step S73). If the difference ΔSOC is positive, then the control quantity corrector 276 acquires, from the +ΔSOC correction map, the ΔSOC correction coefficient for the assistive control process and the ΔSOC correction coefficient for the regenerative control process, which correspond to the absolute value of the calculated +ΔSOC, and stores the acquired ΔSOC correction coefficients in the storage unit 252. If the difference ΔSOC is negative, then the control quantity corrector 276 acquires, from the −ΔSOC correction map, the ΔSOC correction coefficient for the assistive control process and the ΔSOC correction coefficient for the regenerative control process, which correspond to the absolute value of the calculated −ΔSOC, and stores the acquired ΔSOC correction coefficients in the storage unit 252. The difference ΔSOC makes it possible to recognize the assisted state and the regenerated state in a single event of use of the assisted bicycle 10. Specifically, if the difference ΔSOC is positive, then it is recognized that the assistive control process is performed more than the regenerative control process, and the difference ΔSOC is negative, then it is recognized that the regenerative control process is performed more than the assistive control process.

Then, the controller 108 shuts down the control apparatus 250 of the assisted bicycle 10 (step S74). The ΔSOC correction coefficients for the assistive control process and the regenerative control process, which are stored in the storage unit 252 will be used to correct the control quantities of the assistive control process and the regenerative control process in a next event of use of the assisted bicycle 10.

As described above, the pedaling torque at an angular position of the crankshaft 48 is detected, and the assistive control process and the regenerative control process are selectively performed depending on the torque value T of the pedaling torque, i.e., depending on whether or not the torque value T is equal to or smaller than the predetermined level. Therefore, the regenerative control process is performed more frequently to increase the frequency at which the battery 44 is charged, thereby making the battery 44 effective for a longer time.

Since the control quantities of the assistive control process and the regenerative control process are corrected using the ΔV integrated value correction coefficient depending on a change in the vehicle speed information value V, which represents the vehicle speed of the assisted bicycle 10, variations in the rotational speed of the crankshaft 48 due to switching between the assistive control process and the regenerative control process during the rotation of the crankshaft 48 are reduced to make the rider of the assisted bicycle 10 experience a less strange feeling. Specifically, if the rotational speed of the crankshaft 48 is lowered due to the regenerative control process, i.e., if the absolute value of the −ΔV integrated value becomes greater than the first threshold, then the control quantity of the regenerative control process is reduced to minimize the reduction in the rotational speed of the crankshaft 48, and if the rotational speed of the crankshaft 48 is increased due to the assistive control process, i.e., if the absolute value of the +ΔV integrated value becomes greater than the second threshold, then the control quantity of the assistive control process is increased to perform the assistive control process for quickly achieving a vehicle speed desired by the rider, thereby to minimize the increase in the rotational speed of the crankshaft 48.

If the value which is calculated by subtracting the state of charge at the time the assisted bicycle 10 ends to be used from the state of charge at the time the assisted bicycle 10 started to be used in the previous cycle is positive, then the control quantity of the regenerative control process is controlled into an increased control quantity using the +ΔSOC correction map, and if the value is negative, then the control quantity of the assistive control process is controlled into an increased control quantity using the −ΔSOC correction map. Therefore, the state of charge of the battery 44 can be brought into an acceptable range, i.e., the control target range, as quickly as possible. Inasmuch as the control quantities of the assistive control process and the regenerative control process are corrected only if the absolute value of the value, which is calculated by subtracting the state of charge at the time the assisted bicycle 10 ends to be used from the state of charge at the time the assisted bicycle 10 started to be used in the previous cycle is greater than the predetermined value, the assistive control process and the regenerative control process can be performed with stable control quantities, and the ΔSOC correction coefficients for correcting the control quantities of the assistive control process and the regenerative control process are prevented from varying frequently.

If the peak of the torque value T detected by the pedaling force sensor 110 becomes equal to or smaller than the predetermined level, then the assistive transient control process is performed and thereafter it switches to the regenerative control process. Therefore, the crankshaft 48 is prevented from becoming abruptly sluggish, and no abruptly increased load is posed on the rider of the assisted bicycle 10. The regenerative control process thus smoothly starts to be performed without making the rider experience a strange feeling. Specifically, if the peak of the torque value T detected by the pedaling force sensor 110 becomes equal to or smaller than the predetermined level after the assistive mode has switched to the regenerative mode, then the assistive transient mode is determined as the mode to be performed. Accordingly, even if the regenerative mode should be performed, the assisted bicycle 10 is assisted with a reduced assistive ratio as long as the assistive transient mode determined as the mode to be performed. As a result, the rider does not experience a strange feeling during the transition from the assistive mode to the regenerative mode.

Furthermore, since a transient coefficient for reducing an assistive ratio is set each time the crankshaft 48 makes one-half of a revolution, the assistive control process smoothly switches to the regenerative control process without making the rider experience a strange feeling. As there are a plurality of decision maps selectable depending on the SOC of the battery 44, an appropriate mode to be performed can be selected easily depending on the SOC of the battery 44. Decision maps that correspond to lower SOCs of the battery 44 are associated with higher predetermined levels. Therefore, as the SOC of the battery 44 is lower, the regenerative mode is more likely to be determined as the mode to be performed, allowing the battery 44 to be more likely charged.

The above embodiment may be modified as follows.
(Modification 1)

In the above embodiment, when the control apparatus 250 of the assisted bicycle 10 is inactivated, a difference ΔSOC is calculated, and a ΔSOC correction coefficient corresponding to the calculated difference ΔSOC is acquired from a ΔSOC correction map and stored in the ΔSOC correction coefficient storage area 296 of the storage unit 252. However, when the control apparatus 250 of the assisted bicycle 10 is inactivated, a difference ΔSOC may be calculated and the calculated difference ΔSOC may be stored in the storage unit 252.

According to Modification 1, in step S24 shown in FIG. 12 and step S45 shown in FIG. 13, a ΔSOC correction coefficient corresponding to the difference ΔSOC stored in the storage unit 252 is acquired from a ΔSOC correction map. The ΔSOC correction map is set such that the ΔSOC correction coefficient is 1.0, if the absolute value of the calculated difference ΔSOC is equal to or smaller than a value which is 5% of the present SOC of the battery 44.

The ΔSOC correction map is set such that the ΔSOC correction coefficient is 1.0, if the absolute value of the calculated difference ΔSOC is equal to or smaller than the value which is 5% of the present SOC of the battery 44 (i.e., the predetermined value that varies depending on the SOC), and the ΔSOC correction coefficient increases or decreases, if the absolute value of the calculated difference ΔSOC is greater than the value that is 5% of the present SOC of the battery 44. However, the ΔSOC correction map may be set such that the ΔSOC correction coefficient is 1.0, if the absolute value of the calculated difference ΔSOC is equal to or smaller than a predetermined value that is constant, and the ΔSOC correction coefficient increases or decreases, if the absolute value of the calculated difference ΔSOC is greater than the predetermined value that is constant.
(Modification 2)

In the above embodiment and modification 1, the controller 108 may store the difference ΔSOC or the ΔSOC correction coefficients that are stored in the storage unit 252, in the memory card 200 mounted in the display unit 68. The memory card 200, which stores the difference ΔSOC or the ΔSOC correction coefficients therein, may be removed from the display unit 68 and may be mounted in another assisted bicycle 10. The control apparatus 250 of the other assisted bicycle 10 with the memory card 200 mounted therein may correct the control quantities of the assistive control process and the regenerative control process based on the difference ΔSOC or the ΔSOC correction coefficients stored in the memory card 200.

Memory cards 200, which store the data, can be used as follows: A memory card 200 that stores a difference ΔSOC or ΔSOC correction coefficients therein that are obtained when an assisted bicycle 10 is used by a rider tending to use the assistive mode more often, may be mounted in another assisted bicycle 10 wherein the SOC of the battery 44 is low, for quickly recovering the SOC of the battery 44. A memory card 200 that stores a difference ΔSOC or ΔSOC correction coefficients therein that are obtained when an assisted bicycle 10 is used by a rider tending to use the regenerative mode more often, may be mounted in another assisted bicycle 10, which is used by a woman with less physical power, for operating the other assisted bicycle 10 in a stronger assistive control process.
(Modification 3)

In the above embodiment, modification 1, and modification 2, the assistive transient control process is performed while the crankshaft 48 makes one revolution. However, the assistive transient control process is performed while the crankshaft 48 makes a predetermined number of revolutions (e.g., five revolutions). Instead of reducing the transient coefficient each time the crankshaft 48 makes one-half of a revolution (0.5 revolution), the transient coefficient may be reduced each time the crankshaft 48 makes a certain number of revolutions, e.g., one revolution, 1.5 revolutions, etc.
(Modification 4)

In the above embodiment and modifications 1 through 3, the maps including the decision maps, ΔV integrated value correction maps, ΔSOC correction maps, etc. are used. However, calculations may be used rather than these maps. For example, a mode to be performed may be determined by way of calculations and control quantities may be calculated from the torque value T and the vehicle speed information value V.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control apparatus for a motor-assisted bicycle, the control apparatus comprising:
   a pedaling force sensor configured to detect a pedaling torque applied to a crankshaft; and
   a controller configured to control a motor unit of the motor-assisted bicycle in a regenerative control process to charge a battery, if the torque value of the detected pedaling torque is equal to or smaller than a predetermined level, and to control the motor unit in an assistive control process, if said torque value is greater than said predetermined level,
   wherein said control apparatus, in response to a case that a peak value of the torque value is equal to or smaller than said predetermined level, performs an assistive transient control process with an assistive ratio lower than in said assistive control process for a predetermined number of revolutions of the crankshaft, and performs the regenerative control process after the predetermined number of revolutions of the crankshaft if the peak value of the torque value is still equal to or smaller than said predetermined level, and
   wherein said control apparatus varies said predetermined level depending on the state of charge of the battery.

2. The control apparatus for the motor-assisted bicycle according to claim 1, wherein:
   said control apparatus operates in an assistive mode for performing the assistive control process and a regenerative mode for performing the regenerative control process;
   said control apparatus includes a mode determiner for determining which one of the assistive mode and the regenerative mode is to be performed; and
   said mode determiner determines that an assistive transient mode for performing the assistive transient control process is to be performed, if said mode determiner detects that the torque value detected by said pedaling force sensor has a peak equal to or smaller than said predetermined level after the mode to be performed has switched from the assistive mode to the regenerative mode.

3. The control apparatus for the motor-assisted bicycle according to claim 2, further comprising:
   a crankshaft rotational speed detector for detecting a rotational speed of the crankshaft with a counter for measuring a time during which said assistive transient mode continues while the assistive transient mode is performed; and a transient coefficient setting section for setting a transient coefficient to reduce said assistive ratio each time the crankshaft makes one-half of a revolution, wherein said control apparatus performs the assistive transient control process with an assistive ratio that is reduced based on the transient coefficient set by said transient coefficient setting section.

4. The control apparatus for the motor-assisted bicycle according to claim 3, further comprising:

a vehicle speed information detector for detecting a vehicle speed information value representing a vehicle speed of the motor-assisted bicycle; and decision means for determining which one of the assistive mode and the regenerative mode is to be performed, depending on said pedaling torque and the vehicle speed of the motor-assisted bicycle, wherein said mode determiner determines the mode to be performed from said decision means, using the torque value detected by the pedaling force sensor and the vehicle speed information value detected by said vehicle speed information detector.

5. The control apparatus for the motor-assisted bicycle according to claim 2, further comprising:

a vehicle speed information detector for detecting a vehicle speed information value representing a vehicle speed of the motor-assisted bicycle; and decision means for determining which one of the assistive mode and the regenerative mode is to be performed, depending on said pedaling torque and the vehicle speed of the motor-assisted bicycle, wherein said mode determiner determines the mode to be performed from said decision means, using the torque value detected by the pedaling force sensor and the vehicle speed information value detected by said vehicle speed information detector.

6. The control apparatus for the motor-assisted bicycle according to claim 5, further comprising:

a state-of-charge detector for detecting the state of charge of the battery, wherein said decision means includes a plurality of decision means provided depending on the state of charge of the battery; and said mode determiner determines the mode to be performed from the decision means, which corresponds to the state of charge of the battery that is detected by said state-of-charge detector.

7. The control apparatus for the motor-assisted bicycle according to claim 6, wherein said plurality of decision means provided depending on the state of charge of the battery is determined such that said predetermined level is higher as the state of charge of the battery is lower.

8. The control apparatus for the motor-assisted bicycle according to claim 5, wherein said decision means includes a preset decision map.

9. The control apparatus for the motor-assisted bicycle according to claim 1, wherein said control apparatus is configured to start performing the assistive transient control process when the pedaling torque is at the peak value.

10. A control apparatus for a motor-assisted bicycle, comprising:

a torque detecting unit configured to detect a pedaling torque applied to a crankshaft with a pedaling force sensor; and a control unit configured to control a motor unit of the motor-assisted bicycle in a regenerative control process to charge a battery, if the torque value of the detected pedaling torque is equal to or smaller than a predetermined level, and control the motor unit in an assistive control process, if said torque value is greater than said predetermined level, wherein said control apparatus, in response to a case that a peak value of the torque value is equal to or smaller than said predetermined level, is configured to perform an assistive transient control process with an assistive ratio lower than in said assistive control process for a predetermined number of revolutions of the crankshaft, and perform the regenerative control process after the predetermined number of revolutions of the crankshaft if the peak value of the torque value is still equal to or smaller than said predetermined level, and wherein said control apparatus varies said predetermined level depending on the state of charge of the battery.

11. The control apparatus for the motor-assisted bicycle according to claim 10, wherein:

said control unit is configured to operate in an assistive mode to perform the assistive control process and a regenerative mode to perform the regenerative control process;

said control apparatus includes a mode determiner configured to determine which one of the assistive mode and the regenerative mode is to be performed; and said mode determiner determines an assistive transient mode to perform the assistive transient control process is to be performed, if said mode determiner detects that the torque value detected by the pedaling force sensor has a peak equal to or smaller than said predetermined level after the mode to be performed has switched from the assistive mode to the regenerative mode.

12. The control apparatus for the motor-assisted bicycle according to claim 11, further comprising:

a crankshaft rotational speed detector configured to detect a rotational speed of the crankshaft with a counter for measuring a time during which said assistive transient mode continues while the assistive transient mode is performed; and a transient coefficient setting section configured to set a transient coefficient to reduce said assistive ratio each time the crankshaft makes one-half of a revolution, wherein said control apparatus performs the assistive transient control process with an assistive ratio that is reduced based on the transient coefficient set by said transient coefficient setting section.

13. The control apparatus for the motor-assisted bicycle according to claim 12, further comprising:

a vehicle speed information detector configured to detect a vehicle speed information value representing a vehicle speed of the motor-assisted bicycle; and a decision unit configured to determine which one of the assistive mode and the regenerative mode is to be performed, depending on said pedaling torque and the vehicle speed of the motor-assisted bicycle, wherein said mode determiner is configured to determine the mode to be performed from said decision unit, using the torque value detected by the pedaling force sensor and the vehicle speed information value detected by said vehicle speed information detector.

14. The control apparatus for the motor-assisted bicycle according to claim 11, further comprising:

a vehicle speed information detector configured to detect a vehicle speed information value representing a vehicle speed of the motor-assisted bicycle; and a decision unit configured to determine which one of the assistive mode and the regenerative mode is to be performed, depending on said pedaling torque and the vehicle speed of the motor-assisted bicycle, wherein said mode determiner is configured to determine the mode to be performed from said decision unit, using the torque value detected by the pedaling force sensor and the vehicle speed information value detected by said vehicle speed information detector.

15. The control apparatus for the motor-assisted bicycle according to claim 14, further comprising:

a state-of-charge detector configured to detect the state of charge of the battery, wherein said decision unit includes a plurality of decision units provided depending on the state of charge of the battery; and said mode determiner is configured to determine the mode to be performed from the decision unit, which corresponds to the state of charge of the battery that is detected by said state-of-charge detector.

16. The control apparatus for the motor-assisted bicycle according to claim 15, wherein said plurality of decision units provided depending on the state of charge of the battery is determined such that said predetermined level is higher as the state of charge of the battery is lower.

17. The control apparatus for the motor-assisted bicycle according to claim 14, wherein said decision unit includes a preset decision map.

18. The control apparatus for the motor-assisted bicycle according to claim 10, wherein said control apparatus is configured to start performing the assistive transient control process when the pedaling torque is at the peak value.

* * * * *